(12) United States Patent
Jokela

(10) Patent No.: US 12,118,658 B1
(45) Date of Patent: Oct. 15, 2024

(54) SYSTEMS AND METHODS FOR MODIFYING A VIRTUAL REALITY ENVIRONMENT BASED ON A SUBJECT'S POSITION

(71) Applicant: PENUMBRA, INC., Alameda, CA (US)

(72) Inventor: Mars Francisco Jokela, Oakland, CA (US)

(73) Assignee: Penumbra, Inc., Alameda, CA (US)

( * ) Notice: Subject to any disclaimer, the term of this patent is extended or adjusted under 35 U.S.C. 154(b) by 0 days.

(21) Appl. No.: 18/217,238

(22) Filed: Jun. 30, 2023

(51) Int. Cl.
   *G06F 3/01* (2006.01)
   *G06T 15/20* (2011.01)

(52) U.S. Cl.
   CPC .............. *G06T 15/20* (2013.01); *G06F 3/013* (2013.01)

(58) Field of Classification Search
   None
   See application file for complete search history.

(56) References Cited

U.S. PATENT DOCUMENTS

| | | | |
|---|---|---|---|
| 2022/0044038 A1* | 2/2022 | Mizuno | G06Q 30/0269 |
| 2022/0388429 A1* | 12/2022 | Noguchi | B60N 2/0244 |
| 2023/0138952 A1* | 5/2023 | Klein | G06F 3/0236 |
| | | | 345/633 |

* cited by examiner

*Primary Examiner* — Matthew Yeung
(74) *Attorney, Agent, or Firm* — Haley Guiliano LLP

(57) ABSTRACT

A method comprises receiving a value corresponding to a height of a subject, and then determining, using processing circuitry, an eye height of the subject based on the height of the subject and on anthropometric data. In some embodiments, the subject may be using a virtual reality application that includes a displayed virtual environment. Based on the determined eye height of the subject, the processing circuitry may cause at least one environmental parameter of the virtual environment to be modified.

20 Claims, 15 Drawing Sheets

SYSTEMS AND METHODS FOR MODIFYING A VIRTUAL REALITY ENVIRONMENT BASED ON A SUBJECT'S POSITION

INTRODUCTION

The present disclosure is directed to detecting a position of a subject and modifying environmental parameters of a virtual environment in response to the detected position.

SUMMARY

In accordance with some embodiments of the present disclosure, a method comprises receiving a value corresponding to a height of a subject, and determining, using processing circuitry, an eye height of the subject based on the height of the subject and on anthropometric data. The method further comprises causing, using the processing circuitry, at least one environmental parameter of a virtual environment to be modified based on the eye height of the subject.

In some embodiments, the height of the subject comprises a sitting height of the subject, and the method further comprises detecting that the subject is in a standing position and updating the eye height of the subject based on the detecting and on a standing height. In some embodiments, causing the at least one environmental parameter of the virtual environment to be modified comprises causing the at least one environmental parameter of the virtual environment to be modified based on the updated eye height.

In some embodiments, causing the at least one environmental parameter of the virtual environment to be modified comprises repositioning a point of view for the subject in the virtual environment based on the determined eye height. In some embodiments, the virtual environment comprises a displayed elements, and causing the at least one environmental parameter of the virtual environment to be modified comprises changing a location of the displayed element in the virtual environment.

In accordance with some embodiments of the present disclosure, a system comprises processing circuitry configured to receive a value corresponding to a height of a subject and determine an eye height of the subject based on the height of the subject and on anthropometric data. The processing circuitry may then cause at least one environmental parameter of a virtual environment to be modified based on the eye height of the subject.

In accordance with some embodiments of the present disclosure, a device comprises a means for receiving a value corresponding to a height of a subject and a means for determining, using processing circuitry, an eye height of the subject based on the height of the subject and on anthropometric data. The device may further comprise a means for causing at least one environmental parameter of a virtual environment to be modified based on the eye height of the subject In accordance with some embodiments of the present disclosure, a non-transitory computer readable medium has non-transitory computer-readable instructions encoded thereon that, when executed by circuitry, cause the circuitry to perform a method comprising receiving a value corresponding to a height of a subject and determining an eye height of the subject based on the height of the subject and on anthropometric data. The method further comprises causing at least one environmental parameter of a virtual environment to be modified based on the eye height of the subject.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
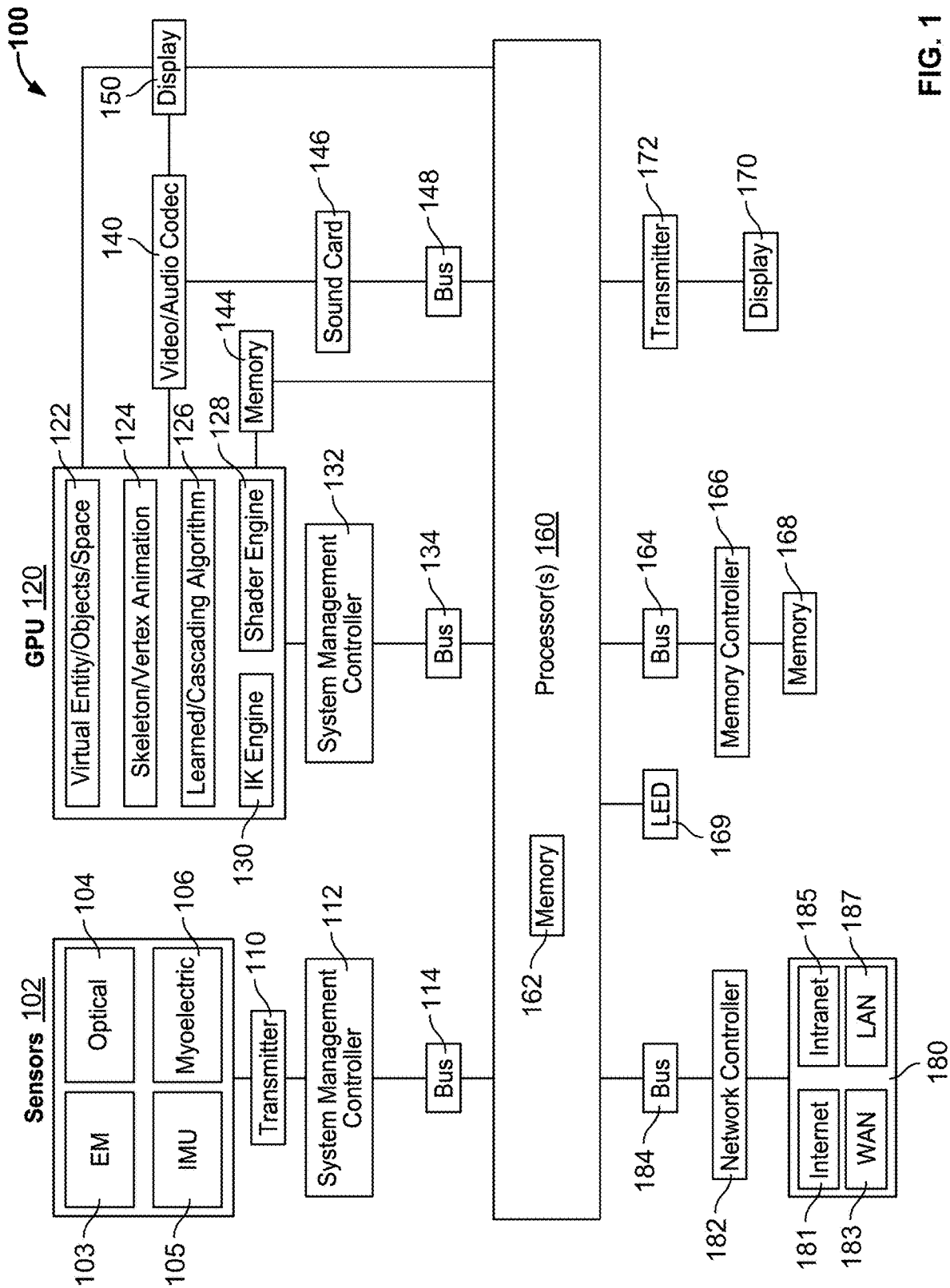
FIG. 1 shows an illustrative VR system in accordance with some embodiments of the present disclosure.

While using a virtual reality (VR) application, a user subject may either be in a sitting or a standing position. In addition, the subject may change between the sitting position and the standing position while using the VR application. For example, where the VR application is used in medical therapy, the subject may transition between the two positions as part of a therapeutic treatment. Systems and methods are provided herein to detect whether the subject is in a sitting or a standing position, and accordingly adjust the virtual environment to reflect the current position of the subject.

In some embodiments, a value corresponding to a height of the subject may be determined. Based on the height value and on known anthropometric data, an eye height of the subject may then be determined. For example, known anthropometric data indicates that the average difference between the height of the subject and the eye height of the subject is 12 centimeters. Therefore, in some embodiments an eye height of the subject may be estimated by subtracting 12 centimeters from the determined height value of the subject. In some embodiments, the eye height of the subject may be directly determined by utilizing a lookup table, where the lookup table is based on the anthropometric data. Based on the height value of the subject, a corresponding eye height may be provided by the lookup table. Environmental parameters in the virtual environment may be accordingly modified based on the determined eye height of the subject. For example, for a first subject and a second subject with different eye heights, the subject with the taller eye height may have a point of view that is relatively higher than that of the shorter subject.

In some embodiments, sensor data may be used to detect that the subject has changed positions. For example, the subject may wear a head-mounted display (HMD) with a sensor that provides a position of the HMD. If the position of the sensor relative to the determined eye height of the subject is significantly different, then the subject may be determined to be in a different position. For example, if the position of the sensor on the HMD is much lower than the determined standing eye height of the subject, the subject may be detected to be in a sitting position. In some embodiments, the user may wear a leg sensor and a hip sensor. Relative positions of the two sensors may be compared in order to detect whether the subject is in the sitting position or the standing position.

In some embodiments, the point of view of the subject in the virtual environment may be repositioned in response to a change in position of the subject. For example, in response to detecting that the subject has transitioned from a standing position to a sitting position, the point of view of the subject in the virtual environment may be lowered.

In some embodiments, objects in the virtual environment may be modified or moved in response to the changing point of view of the subject. For example, the subject may be painting on a canvas while in the standing position. When the subject changes to a sitting position, the location of the canvas may be too high (e.g., the subject cannot see the canvas from the sitting point of view, or cannot easily reach the canvas to continue painting on it). Therefore, the location of the canvas in the virtual environment may be lowered in response to the subject changing from the standing position to the sitting position.

FIG. 1 shows an illustrative arrangement for various elements of a system 100 for a VR application in accordance with some embodiments of the present disclosure. The arrangement includes one or more printed circuit boards (PCBs). In general terms, the elements of this arrangement track, model, and display a visual representation of a point of view of a subject in a virtual environment by running software including the aforementioned VR application.

The arrangement shown in FIG. 1 includes one or more sensors 102, one or more processors 160, graphic processing units (GPUs) 120, video encoder/video codec 140, sound cards 146, transmitter modules 110, network interfaces 180, and light emitting diodes (LEDs) 169. These components may be housed on a local computing system or may be remote components in wired or wireless connection with a local or remote computing system (e.g., a remote server, a cloud, a mobile device, a connected device, etc.). Connections between components may be facilitated by one or more buses, such as bus 114, bus 134, bus 148, bus 184, and bus 164 (e.g., peripheral component interconnects (PCI) bus, PCI-Express bus, or universal serial bus (USB)). With such buses, the computing environment may be capable of integrating numerous components, numerous PCBs, and/or numerous remote computing systems.

One or more system management controllers, such as system management controller 112 or system management controller 132, may provide data transmission management functions between the buses and the components they integrate. For instance, system management controller 112 provides data transmission management functions between bus 114 and sensors 122. System management controller 132 provides data transmission management functions between bus 134 and GPU 120. Such management controllers may facilitate the arrangements orchestration of these components that may each utilize separate instructions within defined time frames to execute applications. Network interface 180 may include an ethernet connection or a component that forms a wireless connection, e.g., 802.11b, g, a, or n connection (WiFi), to a local area network (LAN) 187, wide area network (WAN) 183, intranet 185, or internet 181. Network controller 182 provides data transmission management functions between bus 184 and network interface 180.

The processor 160 may refer to at least one processing device that includes a memory 162 and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry executes instructions for receiving streamed content and executing its display, such as executing application programs that provide interfaces for content providers to stream and display content on a display.

The processing circuitry may thus include communications circuitry suitable for communicating with a content provider server or other networks or servers. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Processor 160 and GPU 120 may execute a number of instructions, such as machine-readable instructions. The instructions may include instructions for receiving, storing, processing, and transmitting tracking data from various sources, such as electromagnetic (EM) sensors 103, optical sensors 104, infrared (IR) sensors 107, inertial measurement units (IMUs) sensors 105, and/or myoelectric sensors 106. The tracking data may be communicated to processor 160 by either a wired or wireless communication link, e.g., transmitter 110. Upon receiving tracking data, processor 160 may execute an instruction to permanently or temporarily store the tracking data in memory 162 such as, e.g., random access memory (RAM), read only memory (ROM), cache, flash memory, hard disk, or other suitable storage component. Memory may be a separate component, such as memory 168, in communication with processor 160 or may be integrated into processor 160, such as memory 162, as depicted.

Memory may be an electronic storage device provided as storage that is part of control circuitry. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage may be used to store various types of content described herein as well as media guidance data described above. Nonvolatile memory may also be used (e.g., to launch a boot-up routine and other instructions). Cloud-based storage may be used to supplement storage or instead of storage.

Storage may also store instructions or code for an operating system and any number of application programs to be executed by the operating system. In operation, processing circuitry retrieves and executes the instructions stored in storage, to run both the operating system and any application programs started by the user. The application programs can include one or more voice interface applications for implementing voice communication with a user, and/or content display applications which implement an interface allowing users to select and display content on display or another display.

Processor 160 may also execute instructions for constructing an instance of virtual space. The instance may be hosted on an external server and may persist and undergo changes even when a participant is not logged in to said instance. In some embodiments, the instance may be participant-specific, and the data required to construct it may be stored locally. In such an embodiment, new instance data may be distributed as updates that users download from an external source into local memory. In some exemplary embodiments, the instance of virtual space may include a virtual volume of space, a virtual topography (e.g., ground, mountains, lakes), virtual objects, and virtual characters (e.g., non-player characters "NPCs"). The instance may be constructed and/or rendered in 2D or 3D. The rendering may offer the viewer a first-person or third-person perspective. A first-person perspective may include displaying the virtual world from the eyes of the avatar and allowing the subject to view body movements from the avatar's perspective. A third-person perspective may include displaying the virtual world from, for example, behind the avatar to allow someone to view body movements from a different perspective. The instance may include properties of physics, such as gravity, magnetism, mass, force, velocity, and acceleration, which cause the virtual objects in the virtual space to behave in a manner at least visually similar to the behaviors of real objects in real space.

Processor 160 may execute a program (e.g., a VR application) for analyzing and modeling tracking data. For instance, processor 160 may execute a program that analyzes the tracking data it receives according to algorithms described above, along with other related pertinent mathematical formulas. Such a program may incorporate a graphics processing unit (GPU) 120 that is capable of translating tracking data into 3D models. GPU 120 may utilize shader engine 128, vertex animation 124, and linear blend skinning algorithms. In some instances, processor 160 or a CPU may at least partially assist the GPU in making such calculations. This allows GPU 120 to dedicate more resources to the task of converting 3D scene data to the projected render buffer. GPU 920 may refine the 3D model by using one or more algorithms, such as an algorithm learned on biomechanical movements, a cascading algorithm that converges on a solution by parsing and incrementally considering several sources of tracking data, an inverse kinematics (IK) engine 130, a proportionality algorithm, and other algorithms related to data processing and animation techniques. After GPU 120 constructs a suitable 3D model, processor 160 executes a program to transmit data for the 3D model to another component of the computing environment (or to a peripheral component in communication with the computing environment) that is capable of displaying the model, such as display 150.

In some embodiments, GPU 120 transfers the 3D model to a video encoder or a video codec 140 via a bus, which then transfers information representative of the 3D model to a suitable display 150. The 3D model may be representative of a virtual entity that can be displayed in an instance of virtual space, e.g., an avatar. The virtual entity is capable of interacting with the virtual topography, virtual objects, and virtual characters within virtual space. The virtual entity is controlled by a user's movements, as interpreted by sensors 102 communicating with the system. Display 150 may display a Subject View. The subject's real-world movements are reflected by the avatar in the virtual world. The virtual world may be viewed in the headset in 3D and monitored on the tablet in two dimensions. In some embodiments, the VR world is an activity that provides feedback and rewards based on the subject's ability to complete activities. Data from the in-world avatar is transmitted from a head-mounted display (HMD), which may be worn on both eyes of the subject and includes a sensor that provides a location of the HMD (e.g., to the processor 160), to the tablet to the cloud, where it is stored for later analysis.

A VR system may also include display 170, which is connected to the computing environment via transmitter 972. Display 170 may be a component of a clinician tablet. For instance, a supervisor or operator, such as a therapist, may securely log in to a clinician tablet, coupled to the system, to observe and direct the subject to participate in various activities and adjust the parameters of the activities to best suit the subject's ability level. Display 170 may depict a view of the avatar and/or replicate the view of the HMD.

Figure 2:
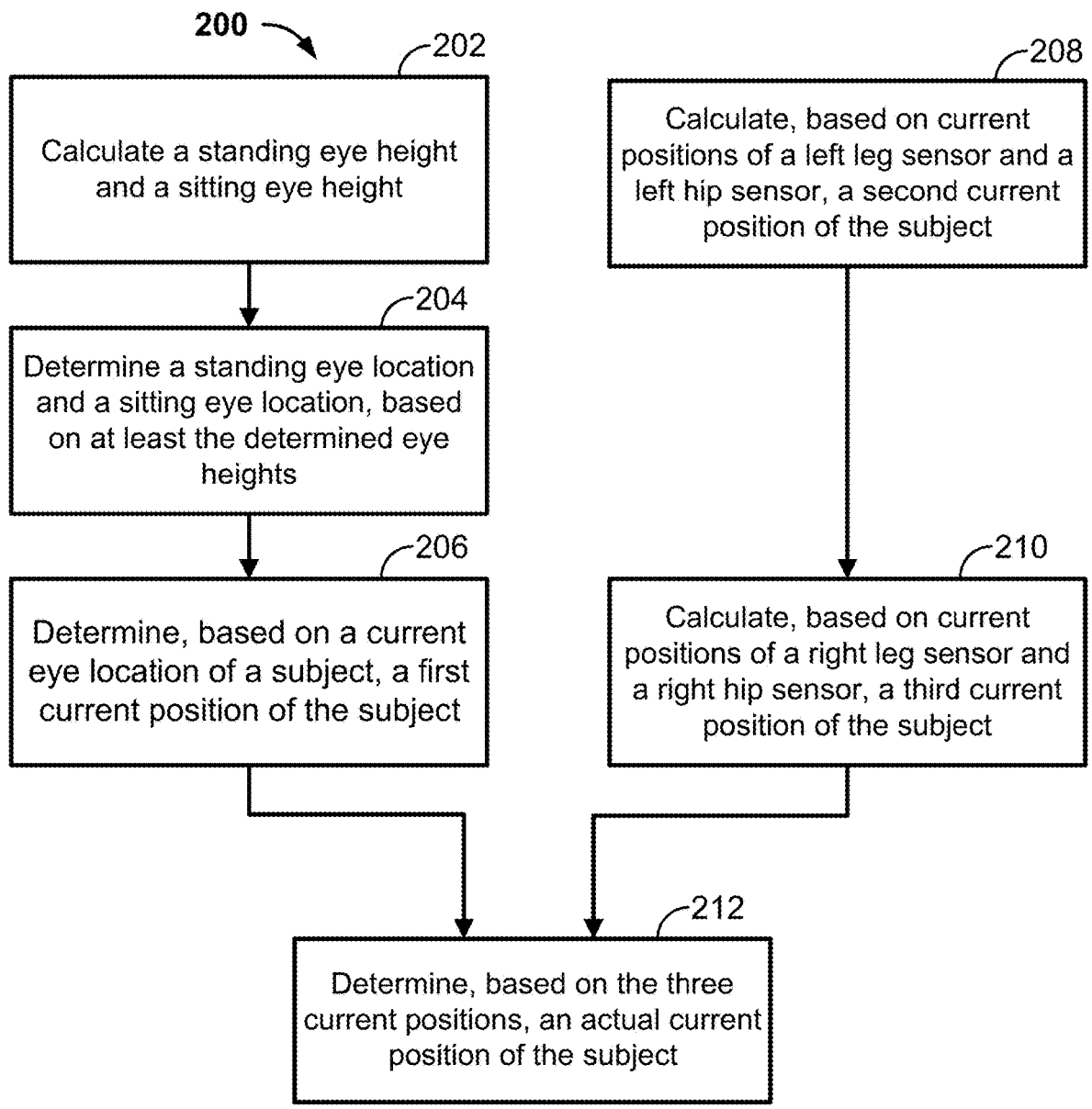
FIG. 2 shows a flowchart of illustrative steps for determining a current position of a subject using a VR application in accordance with some embodiments of the present disclosure.

FIG. 2 shows a flowchart 200 of illustrative steps for determining a current position of a subject using a VR application, in accordance with some embodiments of the present disclosure. In some embodiments, a position of the subject may be a sitting position or a standing position of the subject, a coordinate location of the subject, or a combination thereof. Although FIG. 2 is described in the context of the particular structures, components, and processing of the present disclosure, and although a particular series of steps is depicted in FIG. 2, it will be understood that in some embodiments, one or more of the steps may be modified, moved, removed, or added, and that the flowchart depicted in FIG. 2 may be modified. For example, steps 208 and 210 utilize a left hip sensor, left leg sensor, right leg sensor, and right hip sensor attached to the subject (e.g., in some applications where the subject may be wearing a full-body sensor system), but in applications where the subject is not wearing the hip or leg sensors, steps 208 and 210 need not be included in the steps of flowchart 200.

Processing begins at step 202, where a standing eye height and a sitting eye height of a subject is calculated. In some embodiments, the standing eye height may be determined based off a height of the subject and on known anthropometric data. In some embodiments, the sitting eye height may be calculated using a rough formula. In some embodiments, the rough formula may utilize a known seat height, the determined standing eye height, other suitable inputs, or a combination thereof. Processing may then continue to step 204.

At step 204, a standing eye location and sitting eye location is determined, based on at least the determined eye heights. In some embodiments, the locations may be given by a respective set of coordinates (e.g., where a set includes a X coordinate, Y coordinate, and Z coordinate corresponding to a specific location). In such an embodiment, the Z coordinate of the standing eye location may be, for example, the calculated standing eye height in step 202, and the Z coordinate of the sitting eye location may be the calculated sitting eye height in step 202. In some embodiments, the X and Y coordinates of the standing eye location may be determined by receiving a position of a sensor on a head-mounted display (TIMID) worn by the subject (e.g., as part of the VR application) while the subject is standing. In some embodiments, the sensor may be a motion sensor, a gyroscope sensor, some other suitable sensor to determine a coordinate location (e.g., of the standing eye location of the subject), or a combination thereof. For example, the standing eye location may be determined in a prior calibration process of the VR application. In some embodiments, the X and Y coordinates of the sitting eye location may be calculated based on the X and Y coordinates of the standing eye location and on known anthropometric data. Processing may then continue to step 206.

At step 206, a first current position of the subject is determined, based on the current eye location of the subject. In some embodiments, the current eye location may be determined based on a real-time received location by the HMD worn by the subject. In some embodiments, the current eye location may be compared to the standing eye location and sitting eye location determined in step 204 in order to determine the current position of the subject.

It will be understood that execution of steps 208 and 210 may occur at the same time as execution of steps 202 through 206. At step 208, a second current position is calculated based on current locations of a left leg sensor and a left hip sensor. For example, a calculation process (e.g., as described in FIG. 7) may be utilized to determine, based on a comparison of the location of the left hip sensor and the left leg sensor, if the subject is in a sitting or a standing position. Processing may then continue to step 210.

At step 210, a third current position is calculated based on current locations of a right leg sensor and a right hip sensor. Similarly to the sensor on the HMD worn by the subject, the leg and/or hip sensors may be motion sensors, gyroscope sensors, translational movement sensors, other suitable sensors that can provide a coordinate location, or a combination thereof. It will be understood that the order of steps 208 and 210 may be reversed (e.g., step 210 may occur before step 208 in some embodiments), or that steps 208 and steps 210 may be executed at the same time. Additionally, as previously described, if the subject is wearing a VR system that does not include leg and/or hip sensors, then steps 208 and 210 need not be required in the process depicted by flowchart 200.

At step 212, based on the three determined current positions, an actual current position of the subject is determined. In some embodiments, if two or more of the three current positions (e.g., determined in steps 206, 208, and 210, respectively) match, then the actual position of the subject may be determined to be the specified position. For example, if the first current position and third current position are determined to be "standing" and the second current position is determined to be "sitting", then the actual current position of the subject may be determined to be standing. Such an example may occur if, for instance, the subject is standing on one leg (e.g., in a therapy application that includes balance training). It will be understood that other suitable processes to determine the actual current position of the subject may be utilized in other embodiments. For example, in some embodiments where the subject is not wearing leg and/or hip sensors (e.g., where steps 208 and 210 are removed), the actual current position of the subject may correspond directly to the first determined current position of the subject.

Figure 3A:
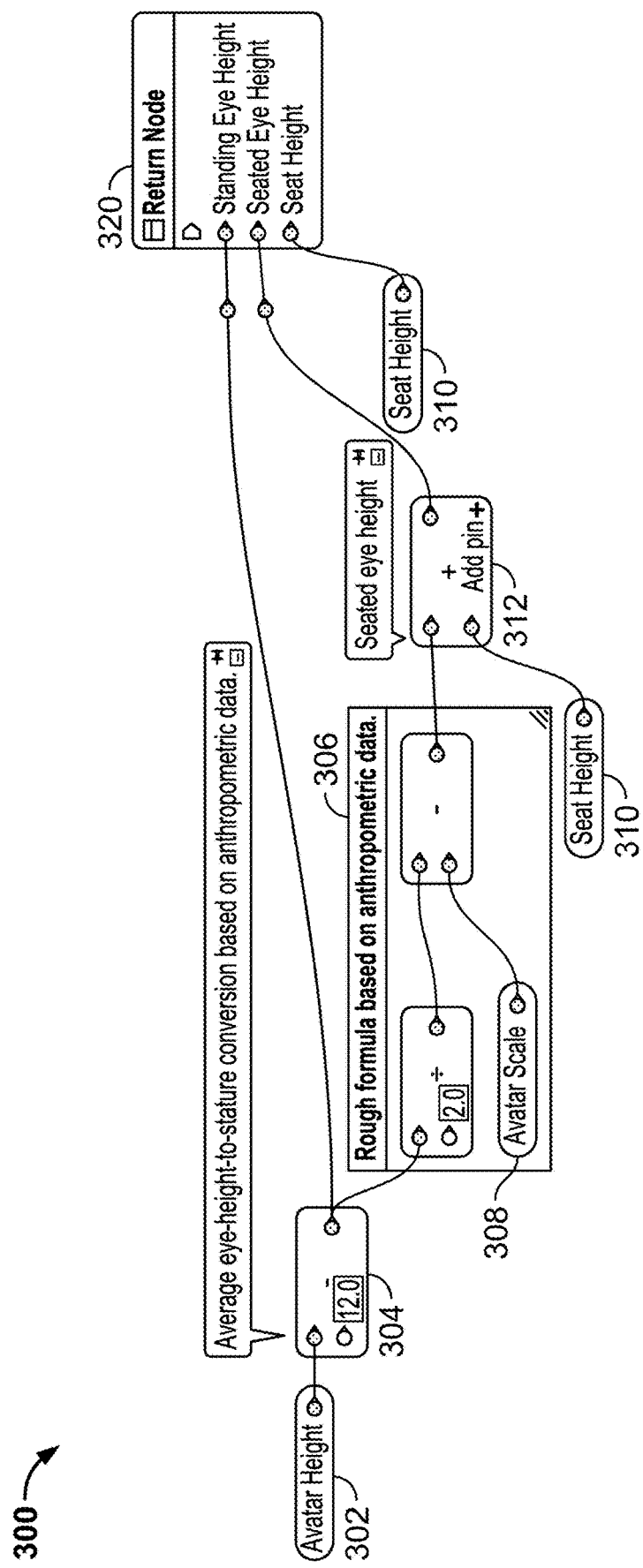
FIG. 3A shows an illustrative diagram of a calculation process to estimate a standing eye height of a subject, a sitting eye height of the subject, and a seat height in accordance with some embodiments of the present disclosure.

FIG. 3A shows an illustrative diagram 300 of a calculation process to estimate a standing eye height of a subject, a sitting eye height of the subject, and a seat height (e.g., that the subject may sit on) in accordance with some embodiments of the present disclosure. The calculation process described in FIG. 3A may correspond to step 202 in flowchart 200. In some embodiments, the calculation process described in FIG. 3A may be executed by processor 160. Although FIG. 3A is described in the context of the particular structures, components, and processing of the present disclosure, and although a particular calculation process is depicted in FIG. 3A, it will be understood that in some embodiments, one or more of the steps may be modified, moved, removed, or added, and that the calculation process depicted in FIG. 3A may be modified.

Execution of the calculation process in diagram 300 begins with an input avatar height 302. In some embodiments, the avatar height 302 may describe the standing height of the subject. The avatar height 302 may be already known. For example, in a medical therapy environment, a therapist may have previously measured the height of the subject and may input the measured height as the input avatar height 302. At step 304, a fixed distance, determined based on anthropometric data, is subtracted from the input avatar height 302 to get the standing eye height. For example, as shown, the avatar height is subtracted by 12 centimeters (cm) to get the standing eye height.

At step 306, a rough formula is applied to the standing eye height determined at step 304 in order to calculate an eye to seat height of the subject in the sitting position. In some embodiments, the rough formula may be based on the anthropometric data. In some embodiments, the subject may be sitting on a chair, therapy bench, or some other suitable seat, and the eye to seat height may be the vertical distance from a top surface of the seat (e.g., where the top surface is the surface that the subject is seated on) to the eyes of the subject. In some embodiments, the rough formula applied in step 306 may include one or more calculations. For example, as shown, the rough formula may include dividing the standing eye height determined at step 304 by a factor of two, and then subtracting the result by an avatar scale 308. Avatar scale 308 is a factor that is linearly proportional to the standing height of the subject (e.g., avatar height 302). For example, an average height may correspond to a value of 1.0 for the avatar scale 308. In some embodiments, the avatar scale 308 may be a factor between 0.7 and 1.3, based on the standing height of the subject. It will be understood that, in other suitable embodiments, the formula in step 306 may have additional calculations. It will also be understood that other suitable formulas may instead be utilized at step 306, where the other suitable formulas to calculate the eye to seat height may be derived or interpolated from the anthropometric data.

At step 312, the eye to seat height calculated in step 306 is used to calculate the seated eye height. It will be understood that the seat height 310 describes the vertical distance from a ground surface (e.g., that the seat is on) to the top surface of the seat. In some embodiments, such as the illustrative example depicted in diagram 300, seat height 310 is a value that may be measured or known beforehand, and therefore the seated eye height may be determined by adding seat height 310 to the eye to seat height calculated in step 306. The resulting seated eye height calculated from step 312 may describe the vertical distance from the ground surface to the eyes of the subject.

At step 320, the standing eye height calculated at step 304, the seated eye height calculated at step 312, and the seat height 310 are output from the calculation process depicted in diagram 300. In some embodiments, the output of step 320 may be used in a VR application that displays a virtual environment. The subject in the virtual environment (e.g., an avatar), for example, may include different points of view based on the seated eye height and the standing eye height. For example, on a standard therapy bench (e.g., where a standard therapy bench has a seat height of approximately 18 inches), the standing height of the subject is higher than the sitting height of the subject, and therefore a standing point of view of the subject in the virtual environment may be higher than a sitting point of view of the subject. In another example, the subject may be a first subject, and a second subject with a shorter standing height may have a lower point of view in the virtual environment when both subjects are standing.

Figure 3B:
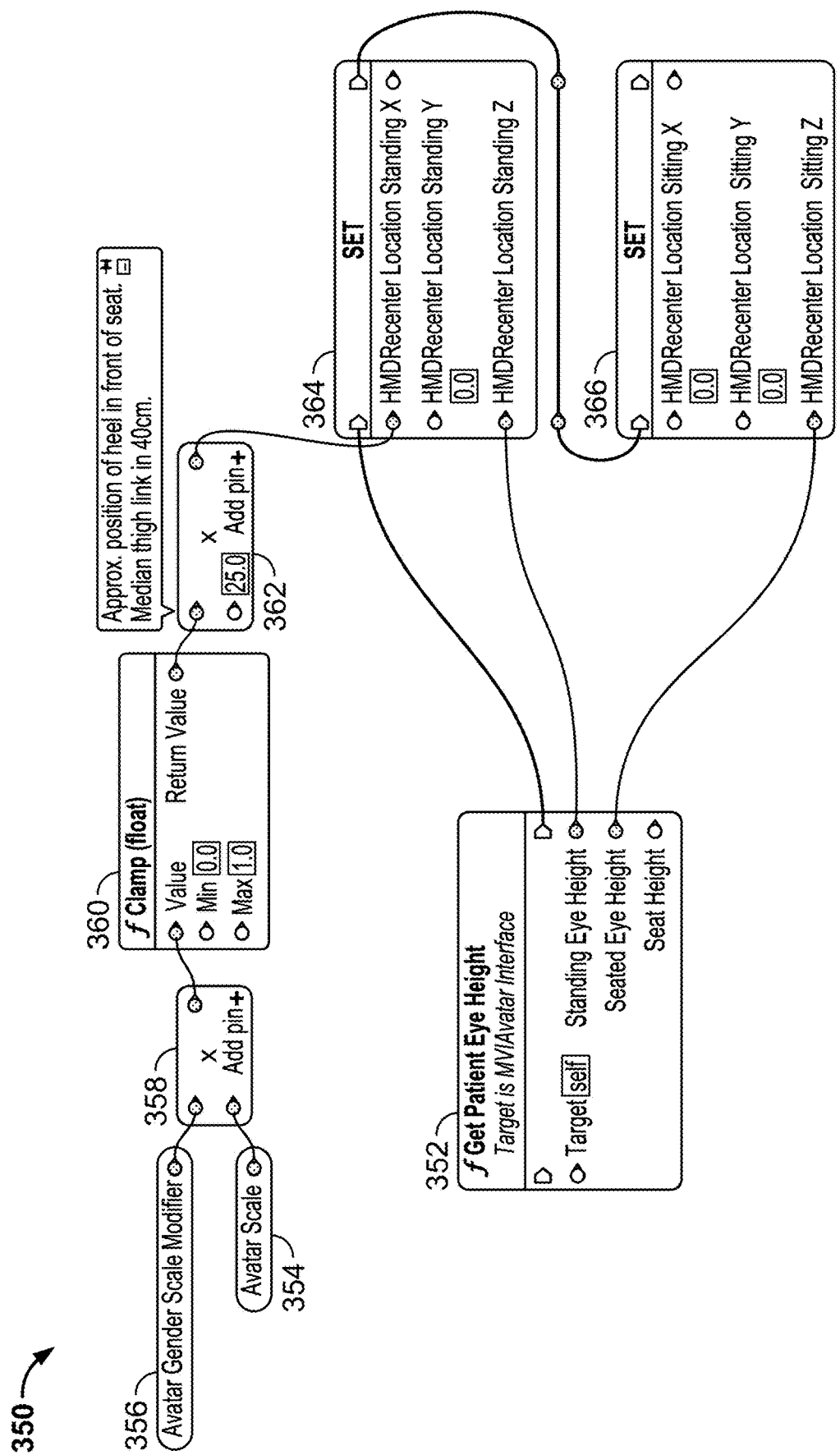
FIG. 3B shows an illustrative diagram of a calculation process to determine a forward offset of a location of a subject as the subject transitions from a sitting position to a standing position in accordance with some embodiments of the present disclosure.

FIG. 3B shows an illustrative diagram 350 of a calculation process to determine a forward offset of a location of a subject as the subject transitions from a sitting position to a standing position in accordance with some embodiments of the present disclosure. The calculation process depicted in FIG. 3B may correspond to step 204 in flowchart 200. In some embodiments, the calculation process depicted in FIG. 3B may be executed by processor 160. More specifically, the subject may wear a HMD, and the coordinate location of the subject may be represented by a location of the HMD (e.g., via a sensor on the HMD). For example, when the subject stands up from a therapy bench (or some other suitable seat), the subject's eyes may move forward in addition to moving upward, because the subject will stand up in front of the therapy bench. Although FIG. 3B is described in the context of the particular structures, components, and processing of the present disclosure, and although a particular calculation process is depicted in FIG. 3B, it will be understood that in some embodiments, one or more of the steps may be modified, moved, removed, or added, and that the calculation process depicted in FIG. 3B may be modified.

Execution of the calculation process in diagram 350 begins at step 352, where a standing eye height and a seated eye height of the subject is input. In some embodiments, the standing eye height and seated eye height may be the values output by step 320 in FIG. 3A. In some embodiments, the standing eye height and seated eye height of the subject may be directly measured.

An avatar scale 304 (e.g., the avatar scale 208) and an avatar gender scale modifier 356 (e.g., a value corresponding to the gender of the subject) may be input, and processing at step 358 may utilize the avatar scale 354 and the avatar gender scale modifier 356 in order to calculate a scale value 360. As shown, for example, at step 358 the avatar scale 354 and the avatar gender scale modifier 356 may be multiplied. In some embodiments, the avatar scale 354 and the avatar gender scale modifier 356 may be determined by creating a look-up table based on anthropometric data. For example, a specific height of the subject may correspond to a specific avatar scale value, and a specific gender of the subject may correspond to a certain avatar gender scale modifier value. The scale value 360 represents the total scaling factor of the subject based on the height of the subject and the gender of the subject. In some embodiments, the scale value 360 may be a number between zero and one.

At step 362, a rough formula is applied to the scale value 360 in order to determine the forward offset of the subject as the subject transitions from the sitting position to the standing position. In some embodiments, the rough formula is based on anthropometric data. As shown, for example, the scale value 360 is multiplied by a median forward offset of 25 centimeters, where the median forward offset is determined based on anthropometric data and describes an approximate horizontal distance between the eyes of the subject and a heel of the subject. When the subject is in the sitting position, a knee of the subject is in front of a hip of the subject. In contrast, when the subject is in the standing position, the knee of the subject is below the hip of the subject (e.g., the distance between the hip and the knee is vertical). Additionally, a heel of the subject may be moved backwards when the subject transitions from the sitting position to the standing position in order to aid with weight shifting as the subject stands up. Based on the anthropometric data, the median forward offset may be estimated (e.g., 25 centimeters as shown), and then scaled by the scale value 360 of the subject in order to determine the actual forward offset of the subject as the subject stands up. It will be understood that the rough formula to determine the forward offset of the subject as described in step 362 may include additional calculations, or may be any other suitable formula derived or interpolated using the anthropometric data. In some suitable alternative methods, the forward offset may be directly determined. For example, the subject may be wearing a full body sensor system (e.g., as part of a full body VR application) that includes at least a hip sensor capable of determining a coordinate location (e.g., of a hip of the subject). The hip sensor may be a motion sensor, a gyroscope sensor, a translational movement sensor, some other suitable sensor, or a combination thereof. As the subject transitions from, for instance, the sitting position to the standing position, a difference between a sitting hip location of the subject and a standing hip location of the subject may be used to determine the forward offset as the subject stands up.

At step 364, a coordinate location of the standing subject is determined. In some embodiments, the coordinate location may include a X coordinate, a Y coordinate, and a Z coordinate. The X coordinate may represent a forward displacement of the subject, and may be centered (i.e., equal to zero) at the location of the sitting subject. The Y coordinate may represent a side-to-side displacement of the subject, and may also be centered at the location of the sitting subject. The Z coordinate may represent a vertical displacement of the HMD that the subject is wearing relative to the ground surface (e.g., the Z coordinate may be centered at the ground surface).

Therefore, in some embodiments, the X coordinate of the standing subject may be the value output by step 362 (e.g., the scale value 360 multiplied by 25 centimeters). Because the subject does not shift side-to-side while transitioning from sitting to standing, the Y coordinate of the standing subject will remain equal to zero. Because the HMD is worn on eyes of the subject, the Z coordinate of the standing subject may be the standing eye height of the subject (e.g., determined in step 352).

Additionally, at step 366, a coordinate location of a sitting subject is also determined. The X and Y coordinates of the sitting subject are equal to zero because the X and Y coordinates are centered on the sitting location of the subject. The Z coordinate of the sitting subject may be the sitting eye height of the subject (e.g., determined in step 352).

Figure 4:
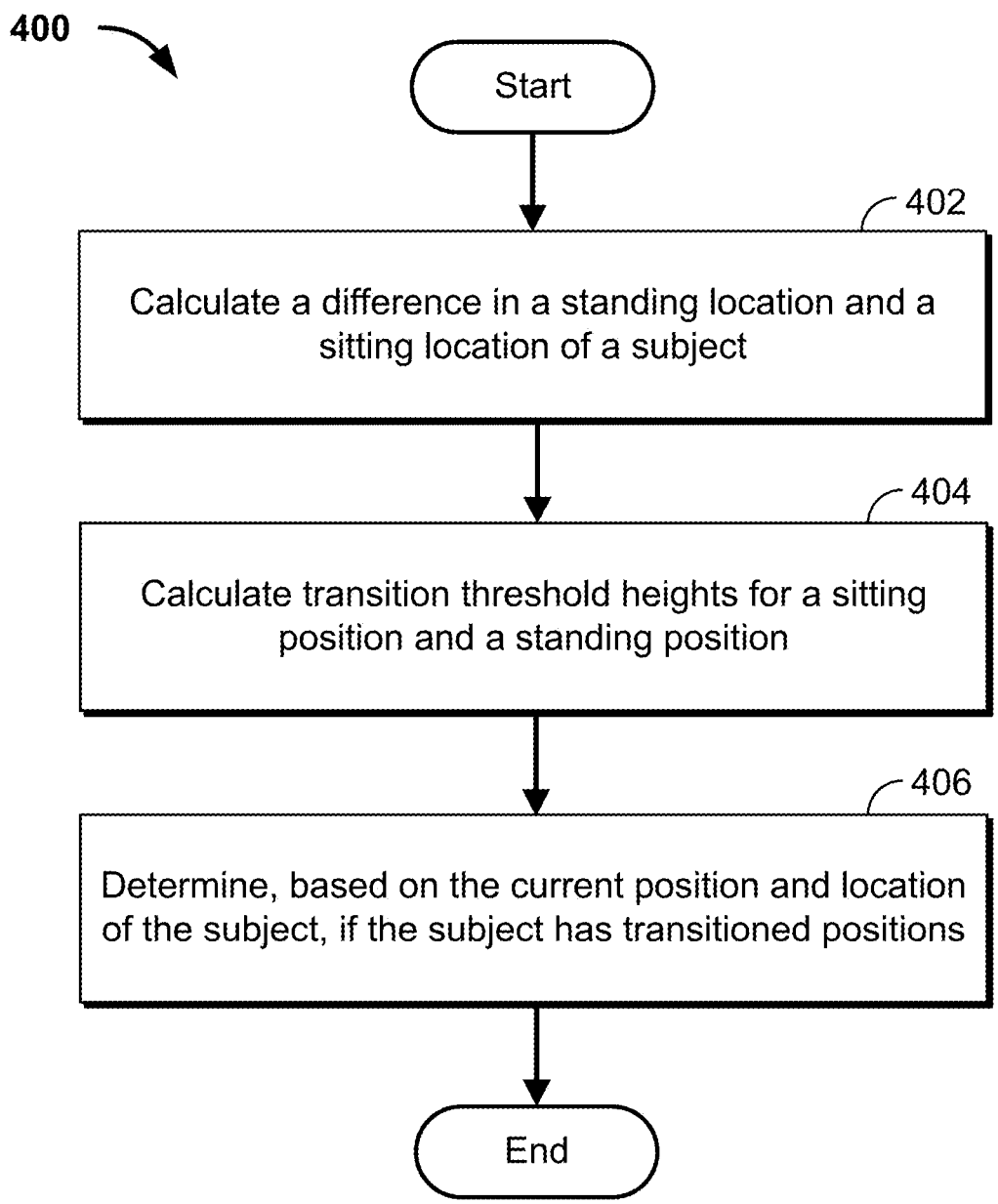
FIG. 4 shows a flowchart 400 of illustrative steps for determining if a sitting or a standing subject has transitioned from one position to the other in accordance with some embodiments of the present disclosure.

FIG. 4 shows a flowchart 400 of illustrative steps for determining if a sitting or a standing subject has transitioned from one position to the other in accordance with some embodiments of the present disclosure. As described below, the steps shown in FIG. 4 may be performed by the processor 160 in FIG. 1. Although FIG. 4 is described in the context of the particular structures, components, and processing of the present disclosure, and although a particular order and flow of steps are depicted in FIG. 4, it will be understood that in some embodiments, one or more of the steps may be modified, moved, removed, or added, and that the order of steps depicted in FIG. 4 may be modified.

Processing begins at step 402, where a difference in a standing location and a sitting location of a subject is calculated. In some embodiments, the difference may be a change in vertical direction of the standing and sitting locations.

Processing may then continue to step 404, where transition threshold heights for a sitting position and a standing position are calculated. In some embodiments, there may be a respective transition threshold height for each position, and the transition threshold height for the sitting position need not be equal to the transition threshold height for the standing position. In some embodiments, calculating the transition threshold heights may include dividing the difference (e.g., calculated in step 402) by three. The result may be multiplied by 1.0 to get a standing transition threshold distance, and the result may be multiplied by 2.0 to get a sitting transition threshold distance. Each transition threshold distance may be added to a known seat height to determine the respective transition threshold height. Processing may then continue to step 406.

At step 406, the processor 160 determines if the subject has transitioned positions, based on the current position (e.g., sitting or standing) and location of the subject. In some embodiments, the location of the subject may be determined using a Z coordinate provided by an HMD worn by the subject. As previously described, the Z coordinate provided by the HMD may represent a distance from the ground to a current eye height of the subject. In some embodiments, if the subject is in the sitting position, the subject may be determined to have transitioned positions (e.g., to the standing position) if the location of the subject increases above the sitting transition threshold distance. In some embodiments, if the subject is in the standing position, the subject may be determined to have transitioned to the sitting position if the location of the subject decreases below the standing transition threshold distance.

Figure 5:
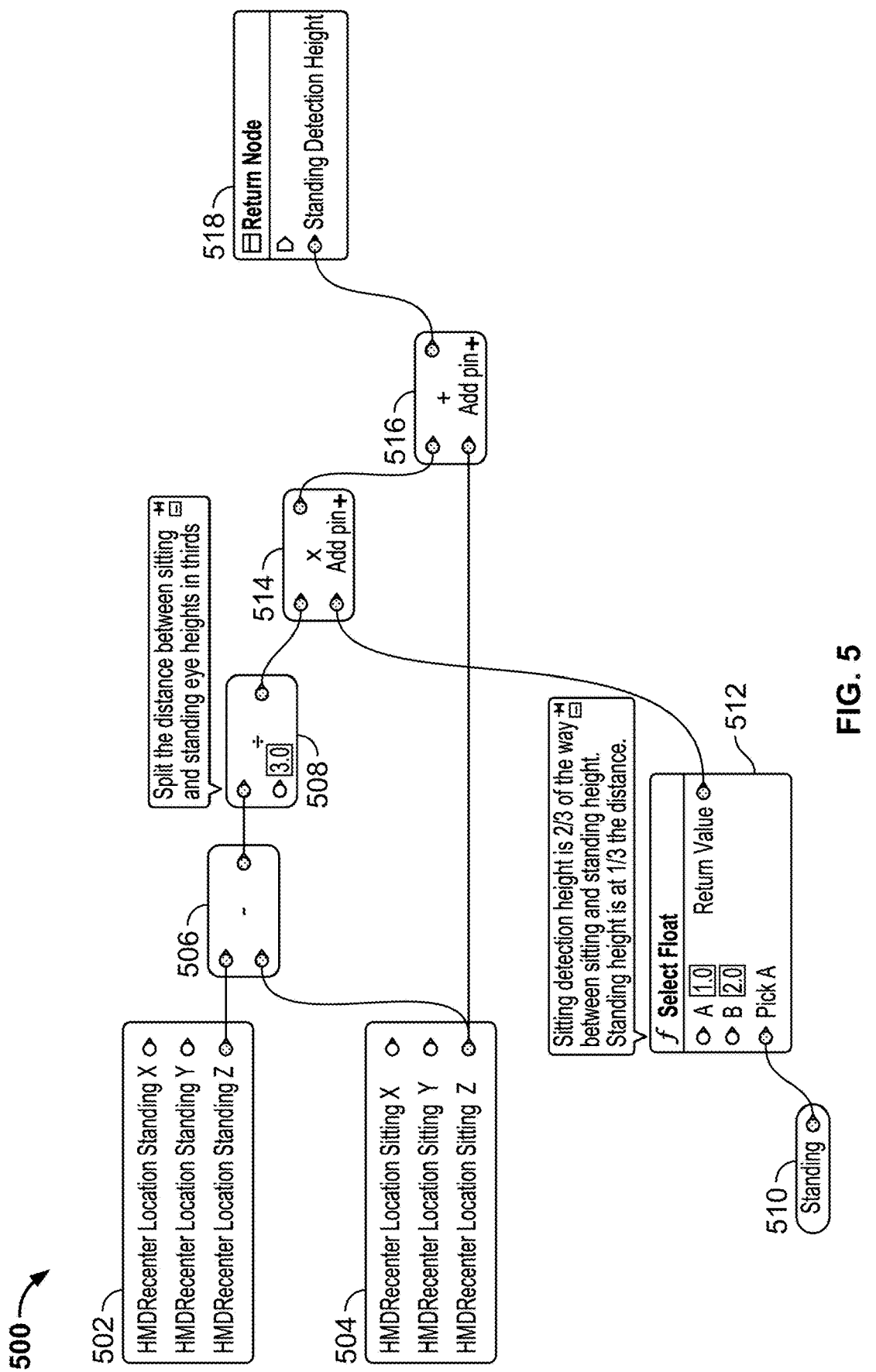
FIG. 5 shows an illustrative diagram of a calculation process to calculate a standing threshold value and a sitting threshold value of a subject to determine that the subject has transitioned from one position to the other in accordance with a specific embodiment of the present disclosure.

FIG. 5 shows an illustrative diagram 500 of a calculation process to calculate a standing threshold value and a sitting threshold value of a subject in accordance a specific embodiment of the present disclosure. In some embodiments, the calculation process described in FIG. 5 may be performed by the processor 160. The calculation process may detail an illustrative example of the method described in flowchart 400. The threshold values may be used, as previously described, to determine if the subject has transitioned from a standing position to a sitting position (or vice versa). Although FIG. 5 is described in the context of the particular structures, components, and processing of the present disclosure, and although a particular calculation process is depicted in FIG. 5, it will be understood that in some embodiments, one or more of the steps may be modified, moved, removed, or added, and that the calculation process depicted in FIG. 5 may be modified.

Execution of the calculation process depicted in diagram 500 begins by receiving a standing coordinate location 502 of the subject in a standing position and a sitting coordinate location 504 of the subject in a sitting position. It will be understood that as previously described, the coordinate location of the subject may correspond to the location of a HMD worn by the subject. The coordinate locations 502 and 504 may be, for example, the coordinate locations determined in steps 314 and 316, respectively.

At step 506, a difference in standing and sitting locations may be calculated. In some embodiments, the value of the Z coordinate of the standing location may be subtracted by the value of the Z coordinate of the sitting location. As described previously, the Z coordinate may be a distance from a ground surface to the HMD worn by the subject (which is worn over both eyes of the subject), and is therefore a larger value when the subject is in the standing position compared to when the subject is in the sitting position.

The difference calculated in step 506 is then divided into three regions via steps 508, 510, 512, and 514. At step 508, the difference is divided by three. At step 510, a current position of the subject is selected (e.g., either standing or sitting), and at step 512, a float value corresponding to the selected position in step 510 is determined. For example, if "standing" is selected at step 510, the float value output by step 512 may be 1.0. If "sitting" is selected at step 510, the float value output by step 512 may be 2.0. It will be understood that additional calculations may be included or substituted in other suitable embodiments.

At step 514, the float value output by step 512 is multiplied by the output of step 508 (e.g., the difference divided by three) to get a transition threshold distance. The transition threshold distance is then added to the Z coordinate value of the sitting subject at step 516, and a resulting transition threshold height value is output by step 518. It will be understood that if "standing" was selected in step 510, then the output in step 518 is a standing transition threshold height. If the coordinate location of the HMD worn by the standing subject decreases below the standing transition threshold height, then it may be determined that the subject has transitioned from the standing position to the sitting position. If "sitting" was selected in step 510, then the output in step 518 is a sitting transition threshold height. If the coordinate location of the HMD worn by the sitting subject increases above the sitting transition threshold height, then it may be determined that the subject has transitioned from the sitting position to the standing position. It will be understood that, in some embodiments, the standing transition threshold height may be the same value as the sitting transition threshold height (e.g., in order to prevent an occurrence where the HMD may wobble between thresholds that are too close in distance and trigger multiple transition events in a short period of time).

Figure 6A:
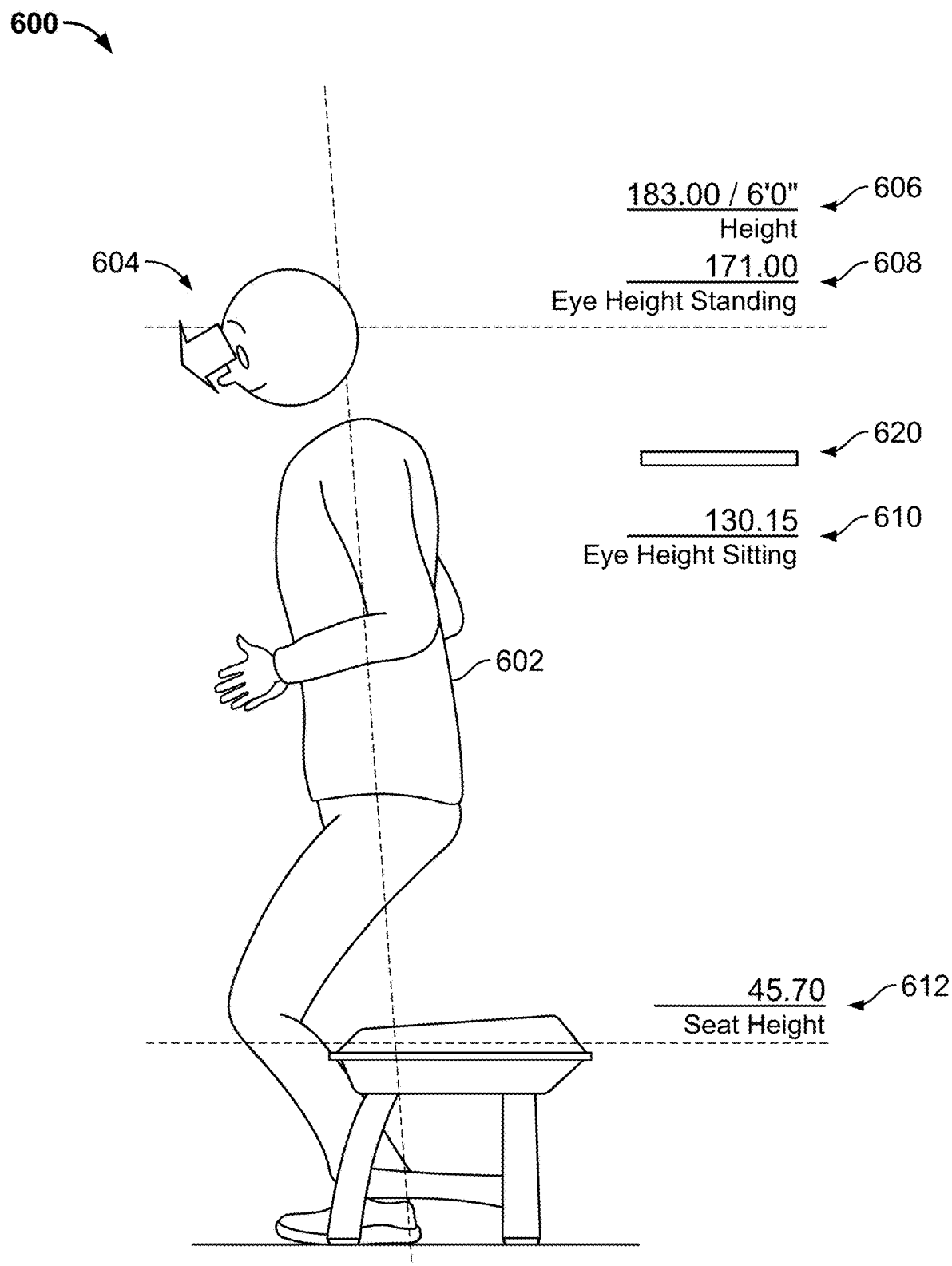
FIG. 6A shows an illustrative example of a subject transitioning from a standing position to a sitting position in accordance with some embodiments of the present disclosure.

FIG. 6A shows an illustrative example 600 of a subject 602 transitioning from a standing position to a sitting position, in accordance with some embodiments of the present disclosure. In some embodiments, the subject 602 may wear an HMD with a sensor that provides a position of the HMD, and the subject 602 may wear the HMD over both eyes. Therefore, the provided position of the HMD may correspond to an eye position 604 of the subject 602. A height 606 of the subject and a seat height 612 may be already known (e.g., by measuring), and the seat height 612 may be the height value of a seat that the subject 602 may intend to sit on, such as a therapy bench, chair, stool, or any other suitable object.

As described in FIG. 2, in some embodiments the known height 606 of the subject may be input, and the standing eye height 608 may then be determined by subtracting a factor (determined via anthropometric data) from the height 606 (e.g., step 204 in FIG. 2). In some embodiments, a sitting eye height 610 of the subject may be calculated if the standing eye height 608 and the height 606 of the subject have been determined. For example, using known seat height 612, the sitting eye height 610 may be calculated via steps 206 and 212, where the avatar scale 208 is determined based on the known height 606 of the subject.

Based on the determined standing eye height 608 and sitting eye height 610, and on the current position of the subject 602, a standing threshold transition value 620 may be subsequently calculated. For example, the standing threshold transition value 620 may be calculated by the process depicted in FIG. 4, where the Z coordinate of the standing subject corresponds to the standing eye height 608, and the Z coordinate of the sitting subject corresponds to the sitting eye height 610. It will be understood because the current position of subject 602 is standing (e.g., "standing" in step 410 in FIG. 4), the standing threshold transition value 620 is one third of the distance between the sitting eye height 610 and the standing eye height 608. If the eye position 604 of the subject decreases below the standing threshold transition value 620, the subject 602 may be determined to have transitioned to a sitting position.

Figure 6B:
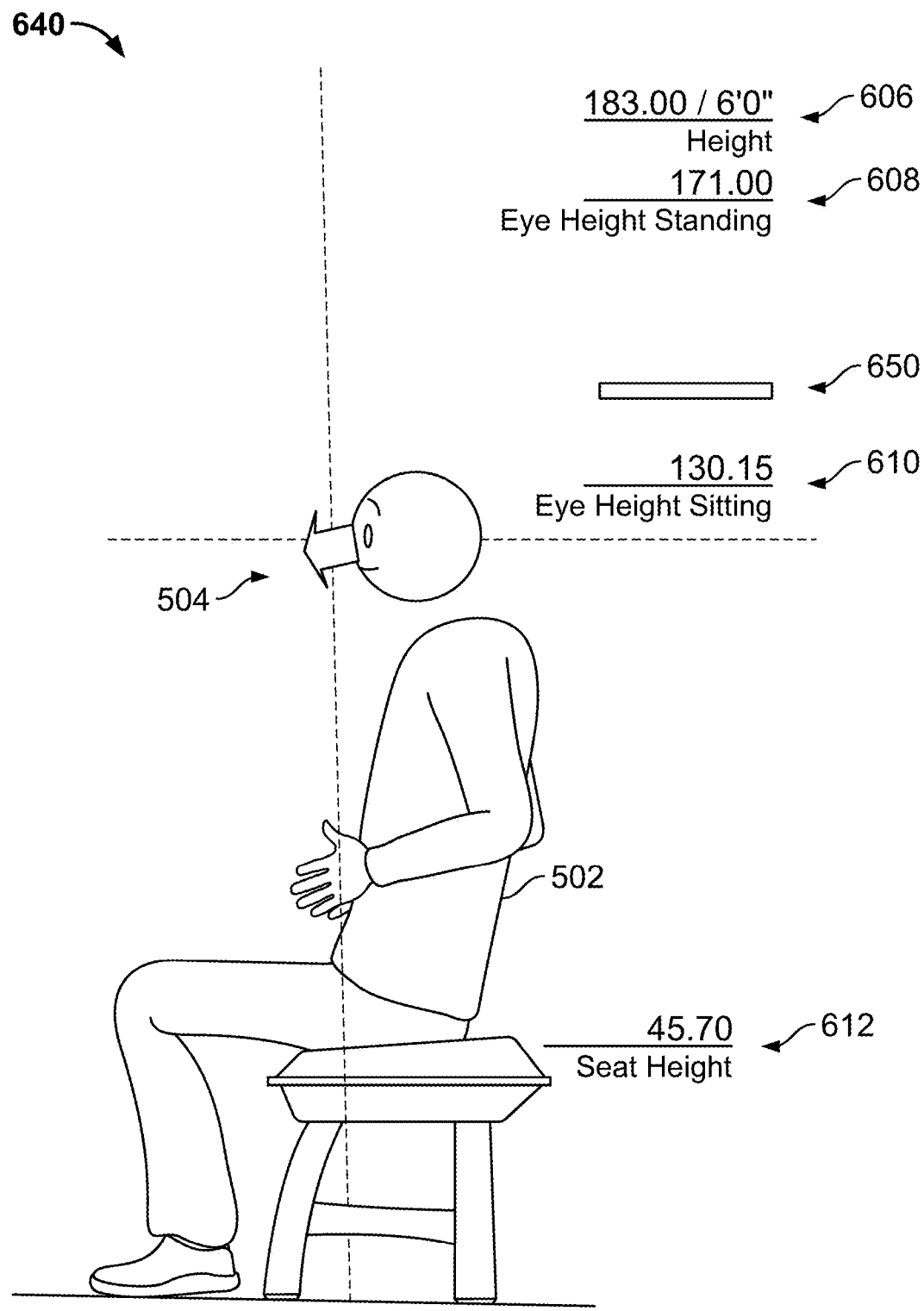
FIG. 6B shows an illustrative example of the subject transitioning from a sitting position to a standing position, in accordance with some embodiments of the present disclosure.

FIG. 6B shows an illustrative example 640 of the subject 602 transitioning from a sitting position to a standing position, in accordance with some embodiments of the present disclosure. It is of note that even when the subject 602 starts in the sitting position, the sitting eye height 610 and the standing eye height 608 may still be calculated as described in FIG. 2, as long as a height of the subject and a seat height are known. While in the sitting position (e.g., "sitting" in step 410 of FIG. 4), a sitting threshold transition value 650 may be calculated. As shown, the sitting threshold transition value is two thirds of the distance between the sitting eye height 610 and the standing eye height 608. If the eye position 604 of the subject increases above the sitting threshold transition value 650, the subject 602 may be determined to have transitioned to a standing position.

In some embodiments, the subject may also be wearing (e.g., in addition to the HMD) one or more sensors on different body parts of the subject. For example, a full body VR system may have the subject wearing at least one sensor on a right and/or left leg, hip, arm, hand, foot, or on other suitable body parts, or a combination thereof. For a subject wearing additional sensors across the body, other suitable processes for detecting the position of the subject may be utilized to increase reliability and reduce errors in position detection.

Figure 7:
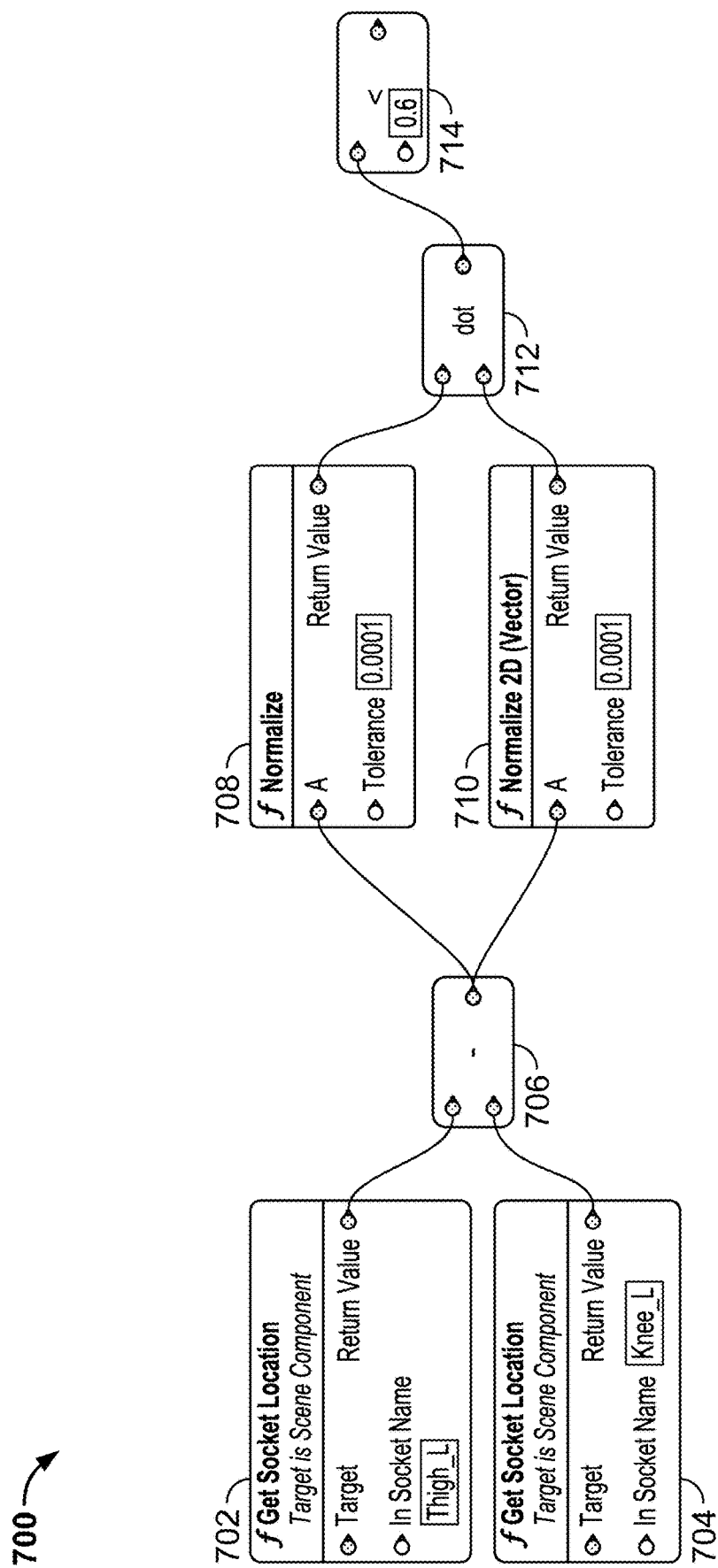
FIG. 7 shows an illustrative diagram of a calculation process to detect the position of the subject based on a comparison of a sensor on a leg of the subject to a sensor on a hip of the subject in accordance with some embodiments of the present disclosure.

FIG. 7 shows an illustrative diagram 700 of a calculation process to detect the position of the subject based on a comparison of at least one sensor on a leg of the subject to at least one sensor on a hip of the subject in accordance with some embodiments of the present disclosure. For example, the subject may wear a full body sensor system that includes a first leg sensor on or proximate to a left knee of the subject, and a second leg sensor on or proximate to a right knee of the subject. The sensor system may also include a first hip sensor located on or proximate to a left hip of the subject, and a right hip sensor located on or proximate to a right hip of the subject. The hip sensors may be located such that a Z coordinate of the first leg sensor (e.g., representing a vertical distance from the sensor to a ground surface) is equal to or close to a Z coordinate of the first hip sensor while the subject is in a sitting position (and similarly for the location of the right hip sensor relative to the right leg sensor). Although FIG. 7 is described in the context of the particular structures, components, and processing of the present disclosure, and although a particular calculation process is depicted in FIG. 7, it will be understood that in some embodiments, one or more of the steps may be modified, moved, removed, or added, and that the calculation process depicted in FIG. 7 may be modified.

Execution of the calculation process depicted in diagram 700 begins at steps 702 and 704, where positions of a leg sensor and a corresponding hip sensor, respectively, are determined. As shown, at step 702 a position of a left hip sensor is determined, and at step 704 a position of a left leg sensor is determined, but it will be understood that steps 702 and 704 may determine positions for a right hip sensor and a right leg sensor, respectively. In some embodiments, the determined positions may be 3-dimensional (3-D) coordinate locations (e.g., including a X coordinate, Y coordinate, and Z coordinate, as described in step 314 in FIG. 3).

At step 706, a vector representing the distance from the coordinates in step 702 to the coordinates in step 704 is determined. In some embodiments, the vector may be calculated by subtracting the coordinates determined in step 702 by the coordinates determined in step 704. As shown, for example, the resulting vector in step 706 represents the distance from the left hip sensor to the left leg sensor. The positions determined in steps 702 and 704 are 3-D coordinate locations, and therefore the resulting vector from step 706 may also be a 3-D vector (e.g., the X coordinate of the resulting vector may be the X coordinate of the position in 702 subtracted by the X coordinate of the position in 704).

At step 708, the result vector from step 706 is normalized (e.g., such that the length of the vector is equal to 1). It will be understood that the result vector from step 706 may be normalized using any known technique to those of ordinary skill in the art. At step 710, the result vector from step 706 has the value of the Z coordinate set equal to zero (e.g., such that the 3-D vector is transformed to a 2-dimensional vector), and the 2-D vector is then normalized.

The normalized 2-D vector at step 710 represents a horizontal vector of reference (see vector 830 in FIG. 8 below) that extends from the coordinate location determined in step 702. The normalized 2-D vector extends horizontally (i.e., with no Z coordinate change) from the left hip sensor. It is also of note that because the normalized 2-D vector uses the X and Y coordinate values of the result vector from step 706, the normalized 2-D vector will extend forward from the hip of the subject, because the knee of the subject is in front of the hip of the subject while the subject is in the sitting position.

At step 712, the normalized vector (e.g., output at step 708) is transformed into a scalar value. In some embodiments, the scalar value may be determining by calculating a dot product of the normalized vector from step 708 and the normalized 2-D vector from step 710. The dot product may be calculated using any known technique to those skilled in the art, such that the result of the dot product is a scalar value. The dot product may be defined as a product of the length of each of the two vectors and the cosine of the angle between the two vectors. Because both the vectors from steps 708 and 710 are normalized with lengths equal to 1, the scalar value is therefore equal to the cosine of the angle between the two vectors.

In some embodiments, the normalized vector output from step 708 may be transformed into a scalar value by calculating a dot product of the normalized vector from step 708 and a vector (0,0,1), where vector (0,0,1) corresponds to a normalized upwards vector of reference with X and Y coordinates set to 0. The output scalar value will be a value between −1.0 and 1.0, where a value of 0.0 indicates that the normalized vector from step 708 is fully horizontal, a value of 1.0 indicates that the normalized vector from step 708 is fully vertical and in the same direction as the vector (0,0,1), and a value of −1.0 indicates that the normalized vector from step 708 is fully vertical and in the opposite direction as the vector (0,0,1). It will be understood that vector (0,0,1) is an example vector of reference, and that other suitable normalized reference vectors may be utilized in other embodiments (e.g., the vector of reference may instead be (0,0,−1).

At step 714, the scalar result of the dot product in step 712 is compared to a threshold value to determine the position of the subject. As shown, the threshold value may equal 0.7, where the value represents the cosine of a number of degrees between 0 and 71 (e.g., because the cosine of an angle is equal to a cosine of an inverse value of the angle). The number of degrees may be a threshold angle. If the angle between the normalized vector from step 708 and the normalized 2-D vector from 710 is smaller than the threshold angle, then the scalar value of the dot product calculated in step 712 will be smaller than the value in step 714. In some embodiments, if the scalar value of the dot product is smaller than the threshold angle, the subject may be detected to be in the sitting position. If the scalar value of the dot product is larger than the threshold angle, the subject may be detected to be in the sitting position.

In some embodiments, the position of the subject may be determined by using a threshold range, instead of a threshold value. For example, as previously described, in some embodiments the scalar value may be determined by calculating a dot product of the normalized vector from step 708 and vector (0,0,1), where the resulting scalar value may have a value from −1.0 to 1.0 (where 0.0 indicates that the normalized vector from step 708 is fully horizontal). Therefore, the threshold range may be from −0.7 to 0.7, and if the calculated scalar value is between the threshold range, then the subject may be detected to have transitioned from the standing position to the sitting position.

In some embodiments, the threshold angle may be different depending on the current position of the subject (e.g., there may be a first value representing a sitting threshold angle and a second value representing a standing threshold angle). For example, the subject may currently be standing, and when the dot product calculated in step 712 decreases below the first value, the subject may be detected as having transitioned to the sitting position. Having different threshold values and/or threshold ranges in the sitting position and the standing position, respectively, prevents the system from rapidly detecting multiple position changes if the dot product value from step 712 wobbles above and below a single threshold angle.

In some embodiments, the subject may be wearing a full body sensor system with at least a HMD (e.g., that includes a sensor providing the position of the HMD), a left and right leg sensor, and a left and right hip sensor. Therefore, both the left leg and hip sensors, and the right leg and hip sensors may execute the calculation process in diagram 700 to determine the position of the subject, and the HMD may execute the calculation process in diagram 400 to determine the position of the subject, such that the VR application utilizing the full body sensor system includes three different determined positions of the subject. In some embodiments, if two or more of the three determined positions match, then the subject is detected to be in that position. For example, if the HMD and the left leg and hip sensors determine that the subject is in the standing position, but the right leg and hip sensors determine that the subject is in the sitting position, the VR application will determine that the subject is in the standing position (e.g., a leg may be bent while the subject is standing, for instance, in some therapy applications).

Figure 8:
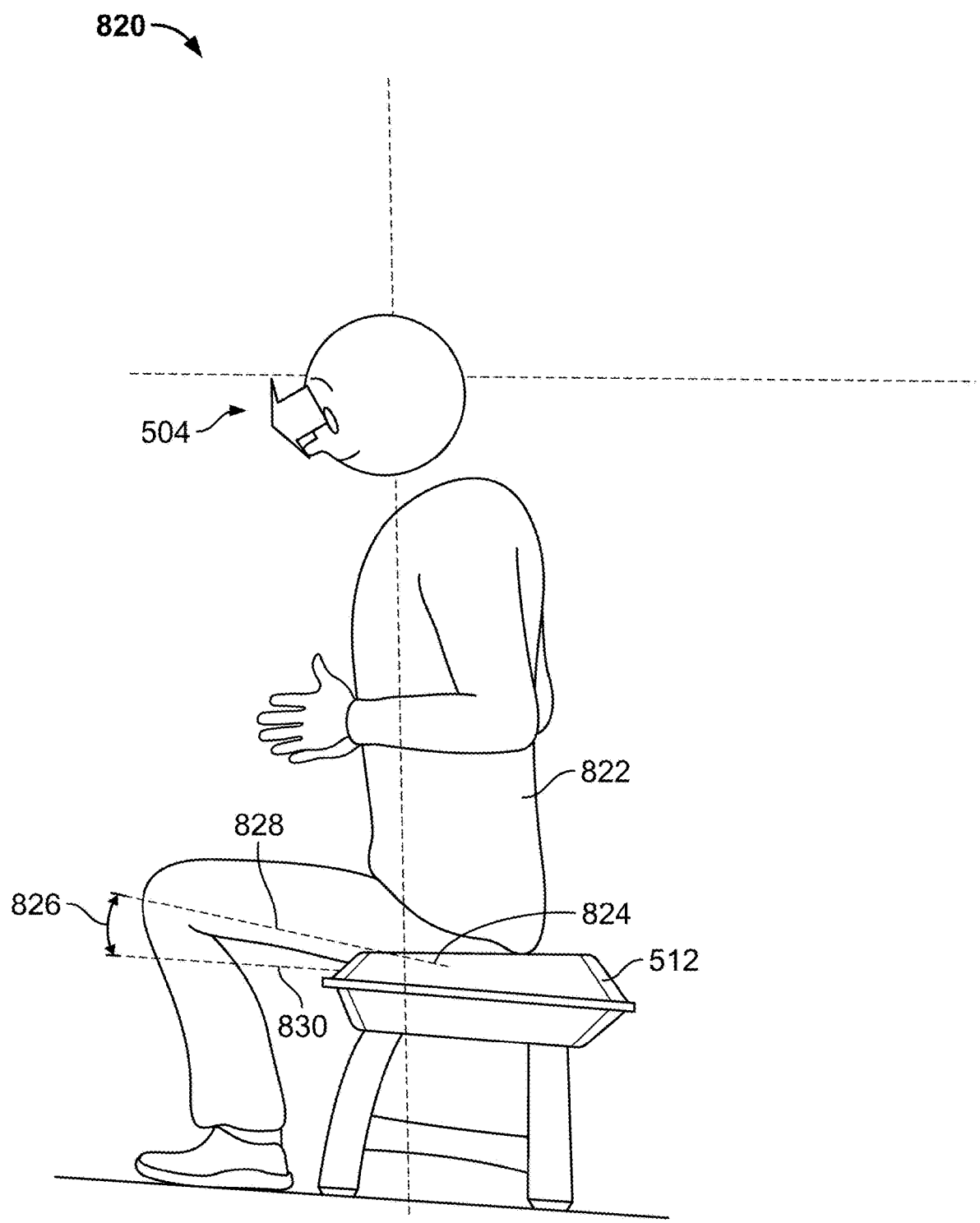
FIG. 8 shows an illustrative example of a subject wearing a full body sensor system that includes at least a left hip sensor, a left leg sensor, and a head-mounted display (HMD) device, in accordance with some embodiments of the present disclosure.

FIG. 8 shows an illustrative example 820 of a subject 822 wearing a full body sensor system that includes at least a left hip sensor 824, a left leg sensor 826, and a HMD device, in accordance with some embodiments of the present disclosure. The HMD device may provide an eye position 504, as previously described in FIG. 5A. While only the left hip sensor 824 and the left leg sensor 826 are depicted, it will be understood that the full body sensor system worn by the subject 822 may include one or more other sensors that are not depicted (e.g., at least a right hip sensor and a right leg sensor).

In accordance with the calculation process depicted in diagram 700 of FIG. 7, a normalized 3-D vector 828 may be calculated (e.g., at step 808), and similarly a normalized 2-D vector 830 may be calculated (e.g., at step 810). A dot product is calculated using the two normalized vectors 828 and 830, and the resulting scalar value is compared to a threshold value to determine the position of the subject. For example, as shown, the angle between vectors 828 and 830 are small because the subject is sitting on a seat 512, and therefore the scalar value of the dot product will be below the threshold, and the subject will be detected to be in the sitting position.

The subject 822 may be utilizing the full body sensor system in a VR application that has a virtual environment that is displayed to the subject (e.g., via the HMD, which is worn over both eyes of the subject). The virtual environment displayed may include one or more objects in the environment (e.g., trees, clouds, a canvas, other objects in the virtual environment, or a combination thereof). Furthermore, the virtual environment may include other additional environmental parameters, such as a point of view that the subject views objects in the virtual environment from. The point of view of the subject may be based on the detected position of the subject.

Figure 9A:
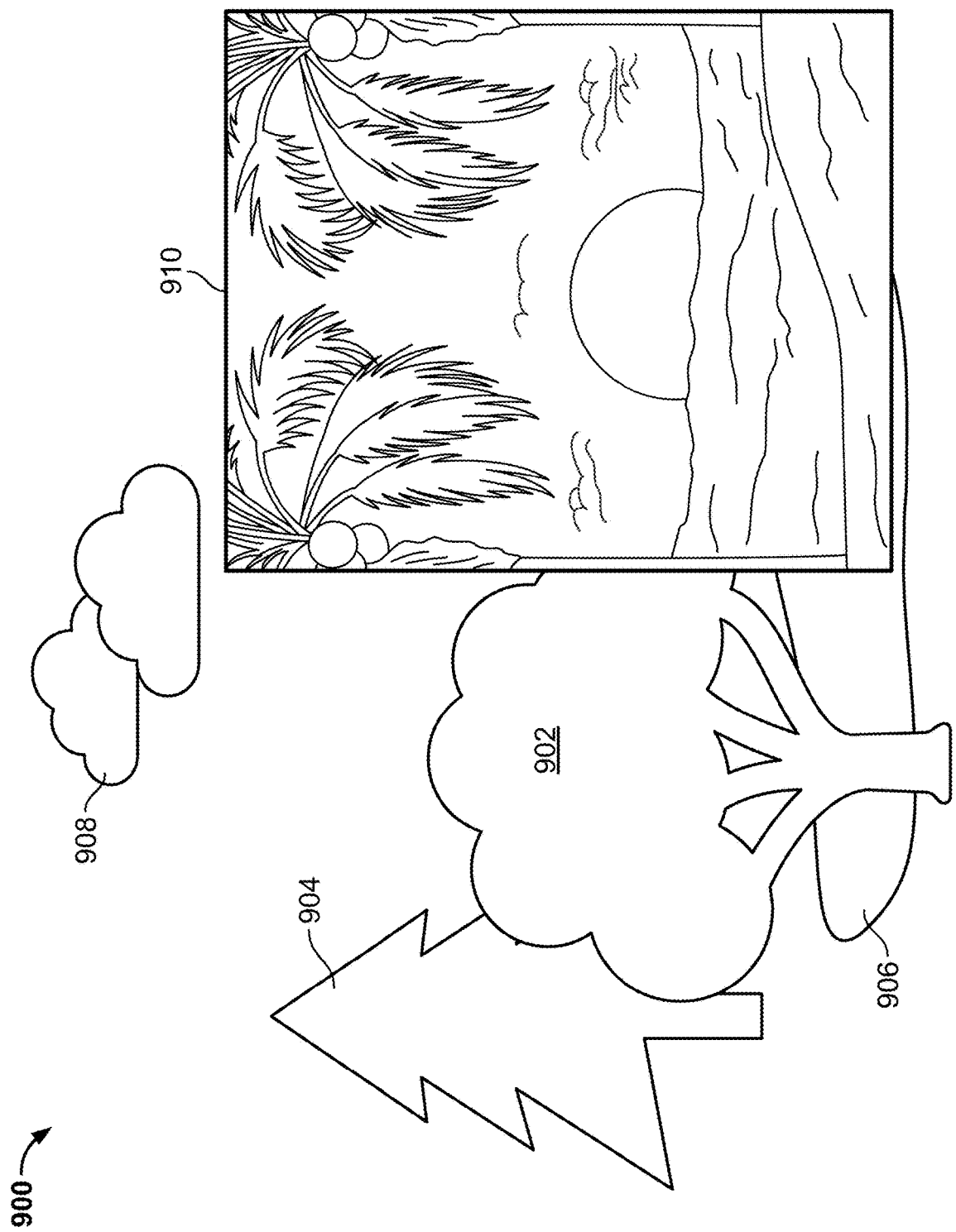
FIG. 9A-9B depicts illustrative examples of the displayed virtual environment through different points of view in accordance with some embodiments of the present disclosure.
Figure 9B:
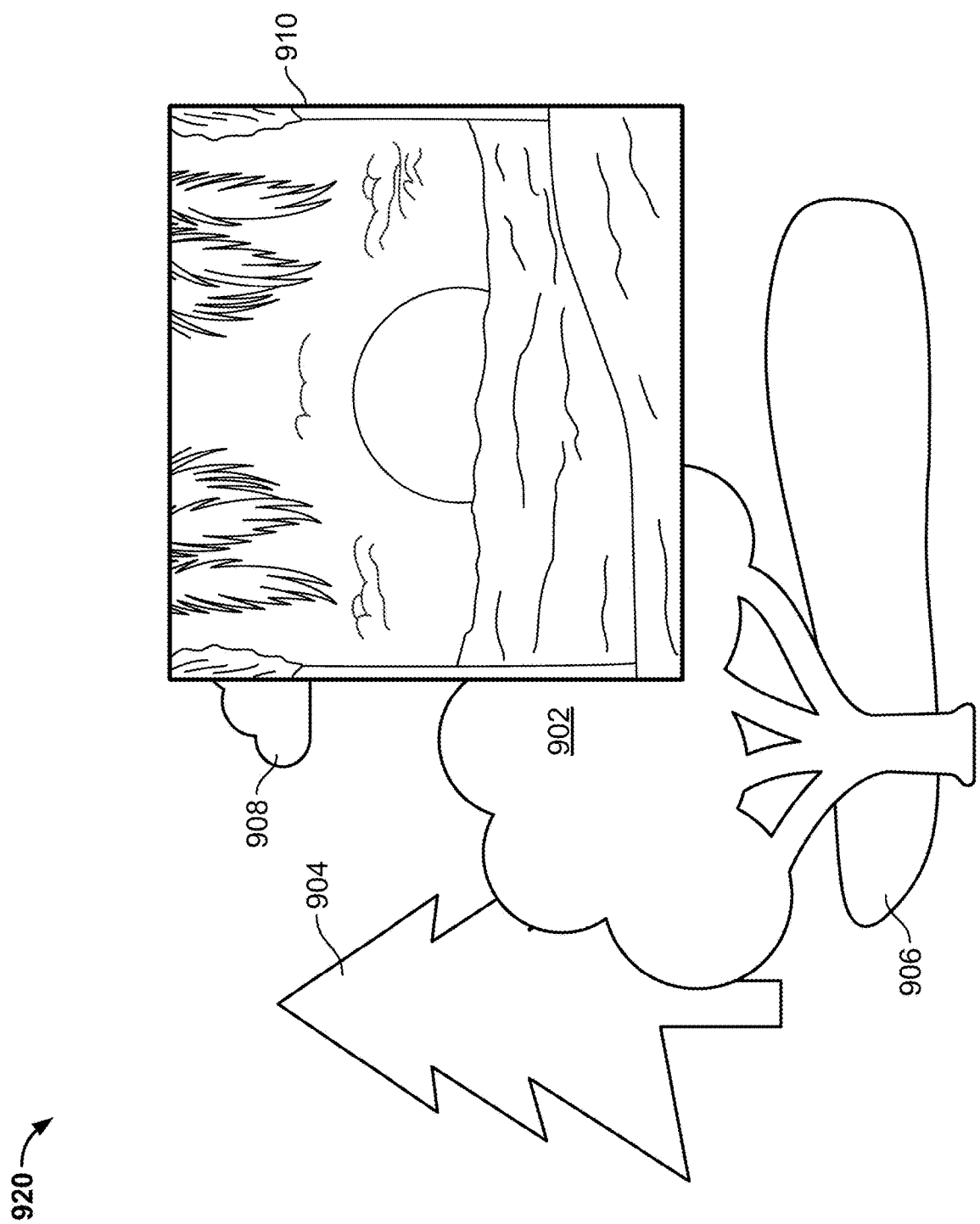
Figure 9C:
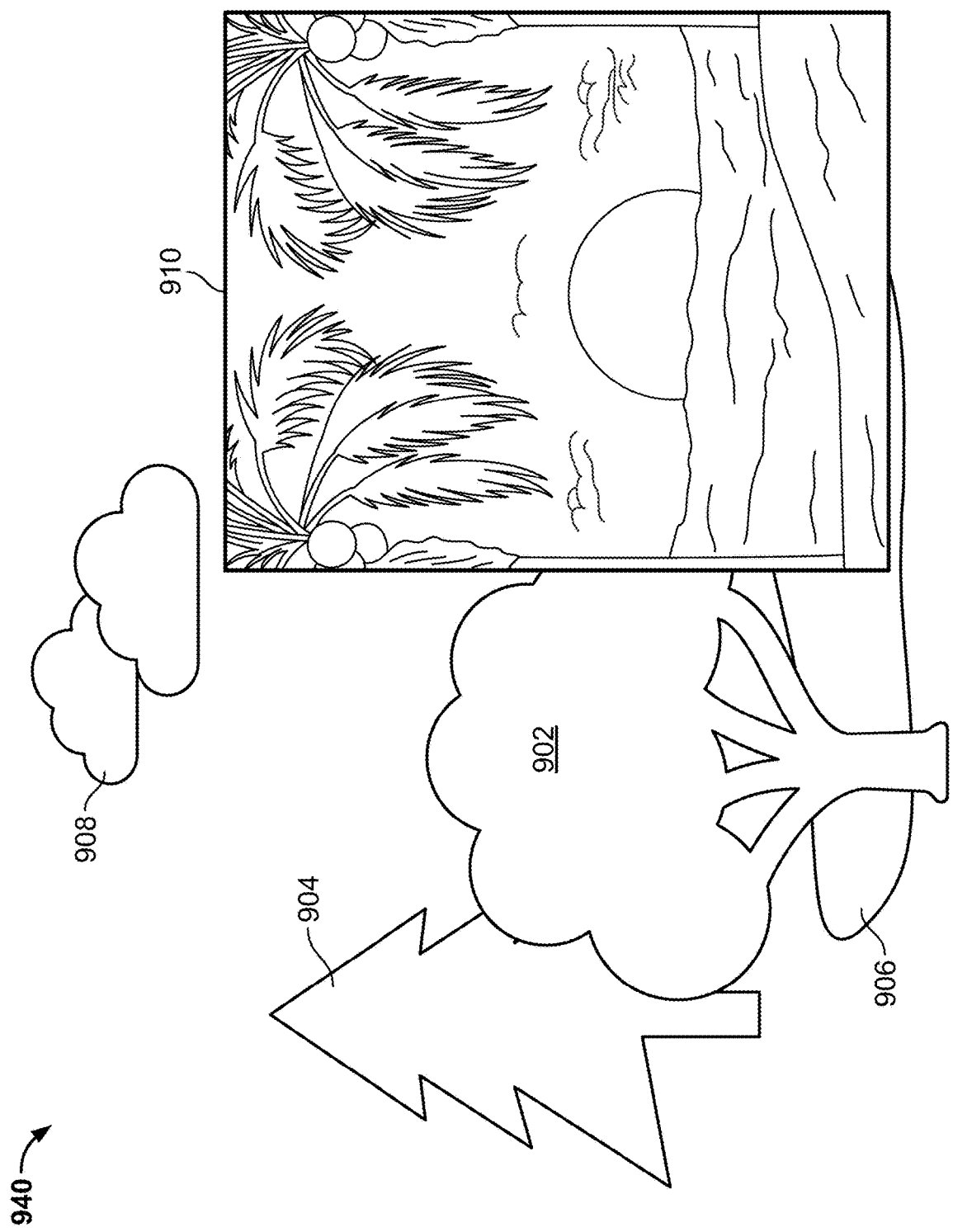
FIG. 9C depicts an illustrative example of objects in the virtual environment being moved in response to the position of the subject in accordance with some embodiments of the present disclosure.

FIG. 9A-9B depicts illustrative examples of the displayed virtual environment through different points of view in accordance with some embodiments of the present disclosure. FIG. 9C depicts an illustrative example of objects in the virtual environment being moved in response to the position of the subject in accordance with some embodiments of the present disclosure. It will be understood that objects in the displayed virtual environment may be added, removed or substituted in other embodiments. Additionally, there may be more suitable points of view of the virtually displayed environment not depicted in FIGS. 9A-9C in other embodiments.

FIG. 9A depicts a virtual environment 900 displayed to the subject (e.g., via a HMD worn by the subject) in a standing position. The virtual environment includes a first tree 902, a second tree 904, a pond 906, clouds 908, and a canvas 910, although it will be understood that objects may be removed, other objects may be added or substituted, or a combination thereof. In some embodiments, the point of view that the subject views the virtual environment from may be based on the standing eye height of the subject (e.g., determined via the calculation process described in diagram 200). For example, if a first subject has a taller standing eye height than that of a second subject, then the first subject may view the virtual environment with a relatively taller point of view. Additionally, the objects in the virtual environment may be of different depths (e.g., virtual distance from the point of view of the subject). For example, the clouds 908 may be far from the point of view of the subject (e.g., high in depth), the trees 902 and 904 and the pond 906 may be closer to the point of view of the subject than the clouds 908, and the canvas 910 may be proximate to the point of view of the subject.

The subject in the virtual environment may also perform actions in the virtual environment, such as painting on the proximate canvas 910. For example, if the subject is wearing a full body sensor system that includes at least one sensor on a hand of the subject, and the subject is moving his or her hand in the real world, then the detected movement of the sensor on the hand may be translated to the virtual environment (e.g., the subject sees painting on the canvas 910 occurring in the virtual environment).

Proceeding to FIG. 9B, the subject may then sit down in the real world. The subject may be detected by at least one sensor to have transitioned to the sitting position (e.g., via the calculation processes depicted in FIG. 4, FIG. 6A, or a combination thereof), and the point of view of the subject in the virtual environment may be shifted as well, in accordance with the determined sitting eye height of the subject (e.g., calculated by the process depicted in diagram 200). Additionally, the point of view of the subject may also move backwards, as the subject may move backwards in the real world to sit down in a seat or a therapy bench (as described in FIG. 3). FIG. 9B depicts the virtual environment 920 displayed via the sitting point of view of the subject.

As shown, the point of view of the subject in FIG. 9B is lowered and moved slightly backwards, such that objects in the virtual environment appear to be slightly further away and have a taller height, despite the locations of the objects in the virtual environment not having been changed. The depth of the objects may affect how much the objects appear to have "moved" in the new point of view. For example, the clouds 908 which are far from the point of view of the subject may not appear much taller or further away. However, the canvas 910, which was proximate to the subject, may appear much taller in the sitting point of view of the subject, such that part of the canvas 910 may not be captured in the sitting point of view of the subject. Additionally, because the canvas 910 is above the point of view of the subject, it may be difficult for the subject to continue painting on the canvas (e.g., because the subject may have difficulty reaching the canvas, or seeing what is being painted on the canvas).

FIG. 9C depicts the virtual environment 940 through the sitting point of view of the subject, but with locations of objects in the virtual environment being moved in response to the changed position of the subject. For example, canvas 910 may be moved downwards, such that the subject may be able to reach and view the entire canvas 910 while in the sitting point of view. In medical therapy applications, the locations of objects in the virtual environment may be moved, for example, by a therapist with administrative control of the virtual environment. It will be understood, however, that there may be other methods of moving objects in a virtual environment in other embodiments, such as by processing circuitry onboard the processor 160 in FIG. 1 in response to detecting a change in position of the subject. Additionally, it may be understood that other objects in the virtual environment may be moved, and other objects may be added, removed, or substituted in other embodiments in response to detecting a new position of the subject.

Figure 10:
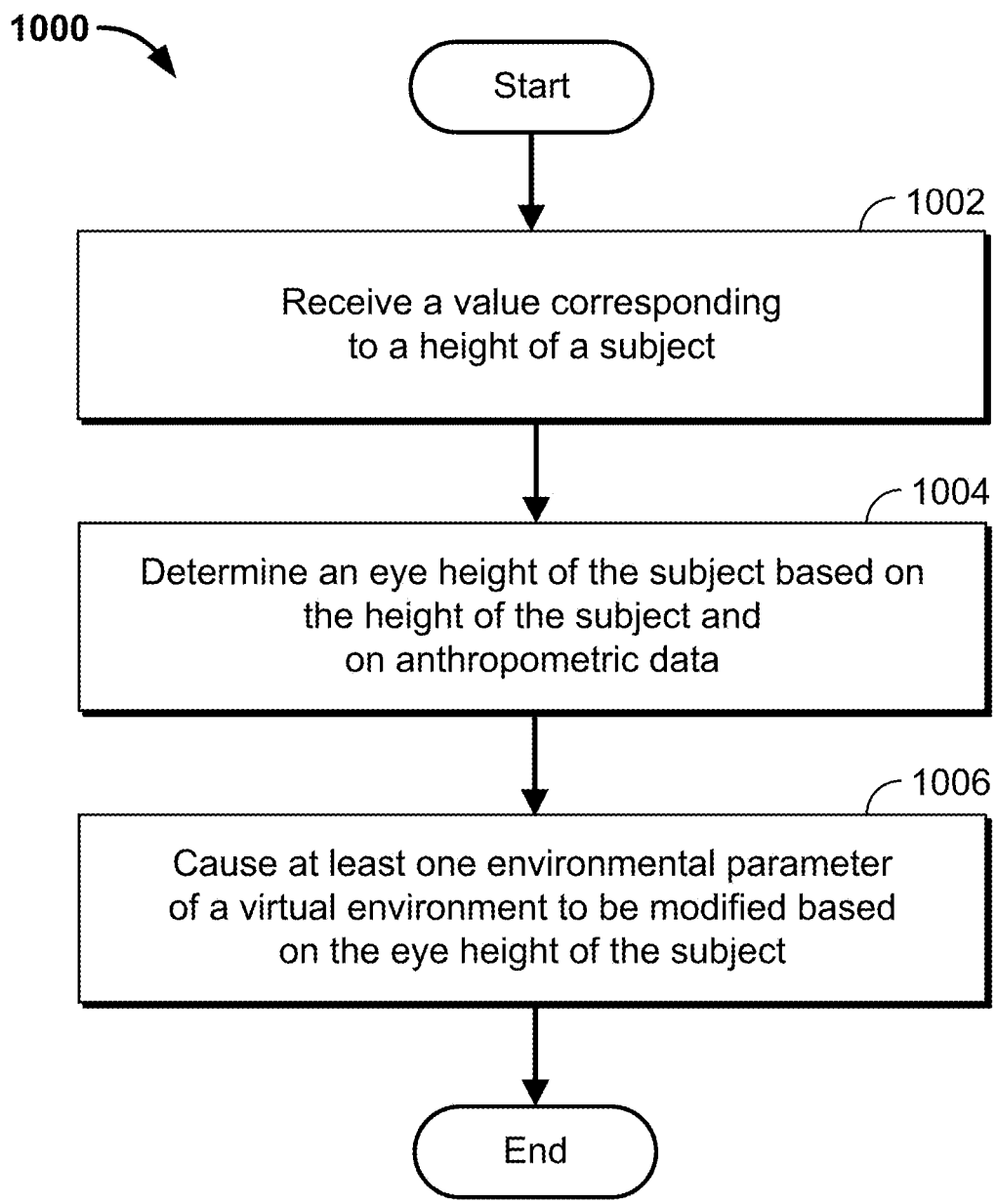
FIG. 10 shows a flowchart of illustrative steps for modifying a virtual environment based on an eye height of a subject in accordance with some embodiments of the present disclosure.

FIG. 10 shows a flowchart 1000 of illustrative steps for modifying a virtual environment based on an eye height of a subject in accordance with some embodiments of the present disclosure. In some embodiments, the subject wears at least a HMD, and may also have other sensors attached, for instance, on one or more hips, one or more knees, other suitable locations on the subject, or a combination thereof. The steps of the flowchart 1000 depicted in FIG. 10 may be executed, for example, by the processor 160 in FIG. 1 (e.g., by processing circuitry onboard processor 160). The HMD may be worn over eyes of the subject, and may include a sensor that provides the location of the HMD. Moreover, the HMD may be part of a VR application and may display to the subject a virtual environment. Although FIG. 10 is described in the context of the particular structures, components, and processing of the present disclosure, and although a particular order and flow of steps are depicted in FIG. 10, it will be understood that in some embodiments, one or more of the steps may be modified, moved, removed, or added, and that the order of steps depicted in FIG. 10 may be modified.

Processing begins at step 1002, where a value corresponding to a height of the subject is received. In some embodiments, the height of the subject may be known beforehand (e.g., the subject knows his or her own height and tells a therapist) or may be directly measured (e.g., by the therapist). The height of the subject may be input as a value and received, for example, by the processor 160 in FIG. 1. Processing may then continue to step 1004.

At step 1004, an eye height of the subject is then determined. The eye height may be based on the received height value of the subject and on anthropometric data. In some embodiments, the eye height may be a standing eye height of the subject, and the standing eye height may be calculated by subtracting 12 centimeters from the received height of the subject. In some embodiments, the standing eye height may be determined using a look-up table, where the look-up is created using the anthropometric data and takes in the height of the subject and returns a corresponding eye height value. It will be understood that other suitable formulas and/or methods may be utilized to determine the eye height of the subject, where the other suitable formulas to calculate the eye height may be derived or interpolated from the anthropometric data. Processing may then continue to step 1006.

At step 1006, based on the determined eye height of the subject, at least one environmental parameter of a virtual environment is modified. The at least one environmental parameter may include a point of view of the subject (e.g., in the virtual environment), locations of one or more objects in the environment, other suitable parameters, or a combination thereof. In some embodiments, the eye height of the subject may be determined (e.g., in step 1004) to have changed, and modifying the at least one environmental parameter may include changing a point of view of the subject in the virtual environment. For example, if the subject changes from a standing to a sitting position, the point of view of the subject in the virtual environment may be lowered (e.g., because the eye height of the subject is lower while sitting).

In some embodiments, if the point of view of the subject in the virtual environment is changed, one or more objects may become difficult for the subject to view or interact with. For example, if the subject is standing and painting on a proximate canvas, and the subject changes to a sitting position (e.g., the subject sits on a therapy bench or other suitable seat), the canvas may be too high to see in the sitting point of view of the subject, or may be too high for the subject to reach to continue painting. Modifying the at least one environmental parameter in such an example may include repositioning the canvas to be in the new point of view of the subject, in reach of the subject, or a combination thereof. The repositioning may occur, for example, by a therapist controlling the placement of objects in the VR application.

Figure 11:
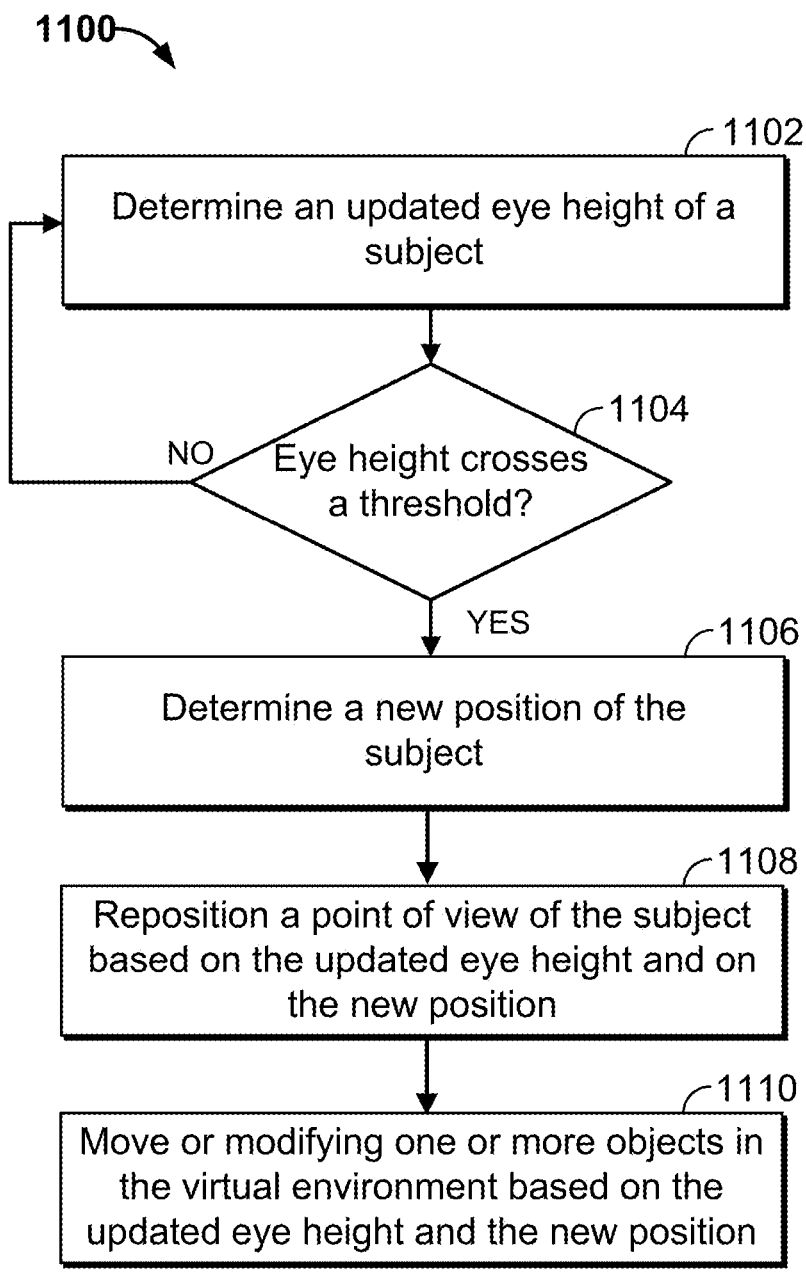
FIG. 11 shows a flowchart of illustrative steps to reposition a point of view of a subject in a virtual environment based on an updated eye height in accordance with some embodiments of the present disclosure.

FIG. 11 shows a flowchart 1100 of illustrative steps to reposition a point of view of a subject in a virtual environment based on an updated eye height, in accordance with some embodiments of the present disclosure. Although FIG. 11 is described in the context of the particular structures, components, and processing of the present disclosure, and although a particular order and flow of steps are depicted in FIG. 11, it will be understood that in some embodiments, one or more of the steps may be modified, moved, removed, or added, and that the order of steps depicted in FIG. 11 may be modified.

Processing begins at step 1102, where an updated eye height of the subject is determined. The updated eye height may represent a current eye height of the subject, and may be determined, for example, via the processing circuitry onboard processor 160 in FIG. 1. In some embodiments, the updated eye height may be determined via a HMD worn by the subject (e.g., where the HMD is worn over both eyes of the subject and includes a sensor that provides the position of the HMD). Processing may then continue to step 1104.

At step 1104, the updated eye height is checked against a threshold. The checking may occur, for example, via the processing circuitry onboard processor 160 in FIG. 1. In some embodiments, the threshold value may be dependent on the current position of the subject. If the subject is in a standing position, the threshold value may be a standing threshold transition value (e.g., where crossing the threshold includes determining that the updated eye height is below the standing threshold transition value), and if the subject is in a sitting position, the threshold value may be a sitting threshold transition value. The standing and sitting threshold transition values may be determined, for example, from the calculation process described in FIG. 4. If the updated eye height crosses the threshold ("YES" to step 1104), processing continues to step 1106. If the updated eye height does not cross the threshold ("NO" to step 1104), processing returns to step 1102, where a new updated eye height of the subject is then determined.

At step 1106, a new position of the subject is determined. For example, if the subject was previously standing, and the updated eye height is below the standing threshold transition value, the subject may now be determined to be in the sitting position. Processing may then continue to step 1108.

At step 1108, a point of view of the subject is repositioned based on the updated eye height and on the new position. For example, if the subject transitions from the standing position to the sitting position, the point of view of the subject will be repositioned lower. In some embodiments, the location of the lower point of view may be determined by calculating the sitting eye height (e.g., via the data flow described in FIG. 2 if the height of the subject is known). In some embodiments, a first subject may have a taller standing eye height than a second subject, and both subjects may transition from the sitting position to the standing position. Even when both subjects are standing, the first subject will still have a taller point of view than that of the second subject because the first subject has a taller standing eye height. Processing may then continue to step 1110.

At step 1110, one or more objects in the virtual environment may be moved based on the updated eye height and the new position. As described in FIG. 9C, a subject may be performing an activity in the virtual environment (e.g., painting on a canvas) while in the standing position. If the subject transitions to a sitting position, and the canvas is out of reach and/or not in the subject's sitting point of view, the canvas in the virtual environment may be moved (e.g., by a therapist with administrative control of the virtual environment, processing circuitry onboard processor 160, other methods of moving objects in a virtual environment or a combination thereof). Additionally, it may be understood that other objects in the virtual environment may be moved, and other objects may be added, removed, or substituted in other embodiments in response to detecting a new position of the subject.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following paragraphs.

While some portions of this disclosure may refer to examples, any such reference is merely to provide context to the instant disclosure and does not form any admission as to what constitutes the state of the art.

What is claimed is:

1. A method comprising:
receiving a value corresponding to a height of a subject defined as a vertical distance from a ground surface on which the subject is supported to a top of the subject's head;
accessing stored anthropometric data;
determining, using processing circuitry, an eye height of the subject based on the value and on the anthropometric data; and
causing, using the processing circuitry, at least one environmental parameter of a virtual environment to be modified based on the eye height of the subject.

2. The method of claim 1, wherein the height of the subject comprises a standing height of the subject or a sitting height of the subject, the method further comprising:
detecting that the subject is in a sitting position or in a standing position; and
updating the eye height of the subject based on the detecting and on a sitting height or on a standing height, wherein causing the at least one environmental parameter of the virtual environment to be modified comprises causing the at least one environmental parameter of the virtual environment to be modified based on the updated eye height.

3. The method of claim 2, wherein the sitting height is predefined.

4. The method of claim 1, wherein causing the at least one environmental parameter of the virtual environment to be modified comprises:
repositioning a point of view for the subject in the virtual environment based on the determined eye height.

5. The method of claim 1, wherein the virtual environment comprises a displayed element, and wherein causing the at least one environmental parameter of the virtual environment to be modified comprises changing a location of the displayed element in the virtual environment.

6. The method of claim 2, wherein detecting that the subject is in the sitting position comprises:
determining a position of a sensor worn by the subject;
comparing the position of the sensor to the eye height; and
detecting that the subject is in the sitting position based on the comparing.

7. The method of claim 6, wherein the sensor comprises a head-mounted device (HMD).

8. The method of claim 2, wherein detecting that the subject is in the sitting position comprises:
receiving at least one signal from at least one respective sensor attached to one or more of a leg of the subject or a hip of the subject; and
detecting that the subject is in the sitting position based on the at least one signal or based on comparing the at least one signal from the leg of the subject and the at least one signal from the hip of the subject.

9. The method of claim 8, further comprising detecting that the subject is in a standing position.

10. A system comprising:
processing circuitry configured to:
receive a value corresponding to a height of a subject defined as a vertical distance from a ground surface on which the subject is supported to a top of the subject's head;
access stored anthropometric data;
determine an eye height of the subject based on the value and on the anthropometric data; and
cause at least one environmental parameter of a virtual environment to be modified based on the eye height of the subject.

11. The system of claim 10, wherein the height of the subject comprises a standing height of the subject, and wherein the circuitry is further configured to:
detect that the subject is in a sitting position; and
update the eye height of the subject based on the detecting and on a sitting height, wherein causing the at least one environmental parameter of the virtual environment to be modified comprises causing the at least one environmental parameter of the virtual environment to be modified based on the updated eye height.

12. The system of claim 10, wherein the height of the subject comprises a sitting height of the subject, and wherein the circuitry is further configured to:
detect that the subject is in a standing position; and
update the eye height of the subject based on the detecting and on a standing height, wherein causing the at least one environmental parameter of the virtual environment to be modified comprises causing the at least one environmental parameter of the virtual environment to be modified based on the updated eye height.

13. The system of claim 11, wherein the sitting height is predefined.

14. The system of claim 10, wherein causing the at least one environmental parameter of the virtual environment to be modified comprises:
repositioning a point of view for the subject in the virtual environment based on the determined eye height.

15. The system of claim 10, wherein the virtual environment comprises a displayed element, and wherein causing the at least one environmental parameter of the virtual environment to be modified comprises changing a location of the displayed element in the virtual environment.

16. The system of claim 11, wherein the circuitry is further configured to:
determine a position of a sensor worn by the subject;
compare the position of the sensor to the eye height; and
detect that the subject is in the sitting position based on the comparing.

17. The system of claim 16, wherein the sensor comprises a head-mounted display (HMD).

18. The system of claim 11, wherein the circuitry is further configured to:
receive at least one signal from at least one respective sensor attached to a leg of the subject; and
detect that the subject is in the sitting position based on the at least one signal.

19. The system of claim 18, wherein the circuitry is further configured to:
receive at least one signal from at least one respective sensor attached to a hip of the subject; and
detect that the subject is in the sitting position based on comparing the at least one signal from the leg of the subject and the at least one signal from the hip of the subject.

20. The system of claim 10, wherein the circuitry is further configured to detect that the subject is in a standing position.

* * * * *